(12) United States Patent
Soffer

(10) Patent No.: US 9,791,944 B2
(45) Date of Patent: Oct. 17, 2017

(54) SECURED KVM SYSTEM HAVING REMOTE CONTROLLER-INDICATOR

(71) Applicant: HIGE SEC LABS LTD.

(72) Inventor: Aviv Soffer, Geva Carmel (IL)

(73) Assignee: HIGE SEC LABS LTD, Yokneam (IL)

( * ) Notice: Subject to any disclaimer, the term of this patent is extended or adjusted under 35 U.S.C. 154(b) by 0 days.

(21) Appl. No.: 15/075,977

(22) Filed: Mar. 21, 2016

(65) Prior Publication Data

US 2016/0203343 A1    Jul. 14, 2016

Related U.S. Application Data

(63) Continuation-in-part of application No. 12/711,998, filed on Feb. 24, 2010, now abandoned.

(51) Int. Cl.
| | |
|---|---|
| *H04L 29/06* | (2006.01) |
| *G06F 3/023* | (2006.01) |
| *G06F 13/10* | (2006.01) |
| *G06F 13/40* | (2006.01) |
| *G06F 21/86* | (2013.01) |

(Continued)

(52) U.S. Cl.
CPC ............ *G06F 3/023* (2013.01); *G06F 13/102* (2013.01); *G06F 13/4022* (2013.01); *G06F 13/4068* (2013.01); *G06F 21/556* (2013.01); *G06F 21/74* (2013.01); *G06F 21/82* (2013.01); *G06F 21/83* (2013.01); *G06F 21/85* (2013.01);

(Continued)

(58) Field of Classification Search
CPC .... G06F 21/85; G06F 13/102; G06F 13/4022; G06F 13/4068; G06F 21/86; G06F 21/83; G06F 21/82; G06F 21/74; G06F 21/556; G06F 2221/2153; G06F 2221/2149; G06F 3/023

See application file for complete search history.

(56) References Cited

U.S. PATENT DOCUMENTS

| | | | | |
|---|---|---|---|---|
| 7,774,774 B1 * | 8/2010 | Mulligan | ............ | G06F 9/44505 717/168 |
| 2002/0120786 A1 * | 8/2002 | Sehayek | ................ | G06Q 10/06 719/310 |

(Continued)

*Primary Examiner* — Carl Colin
*Assistant Examiner* — Ghodrat Jamshidi
(74) *Attorney, Agent, or Firm* — William H. Dippert; Laurence A. Greenberg; Werner H. Stemer

(57) ABSTRACT

A secure peripheral switching system comprises a secure peripheral switch remotely coupled to a secure remote controller-indicator, wherein the secure peripheral switch is capable of interfacing with at least two coupled host computers while ensuring data isolation among said at least two coupled host computers, said secure peripheral switch comprising a first interface circuitry to securely link the secure peripheral switch with said secure remote controller-indicator; and a secure remote controller-indicator. The secure remote controller-indicator comprises a second interface circuitry to securely link said secure remote controller-indicator with said secure peripheral switch; a control function capable of enabling a remote user control of said coupled secure peripheral switch; an indication function capable of providing a remote user indications of coupled secure peripheral switch; and an anti-tampering circuitry to detect physical tampering event and report such event to said secure peripheral switch.

16 Claims, 25 Drawing Sheets

(51) Int. Cl.
*G06F 21/55* (2013.01)
*G06F 21/74* (2013.01)
*G06F 21/82* (2013.01)
*G06F 21/83* (2013.01)
*G06F 21/85* (2013.01)

(52) U.S. Cl.
CPC ...... *G06F 21/86* (2013.01); *G06F 2221/2149* (2013.01); *G06F 2221/2153* (2013.01)

(56) References Cited

U.S. PATENT DOCUMENTS

| | | | |
|---|---|---|---|
| 2006/0267936 A1* | 11/2006 | Hoerl | G06F 3/023 345/158 |
| 2007/0130573 A1* | 6/2007 | Farquhar | G06F 13/4295 719/321 |
| 2007/0283450 A1* | 12/2007 | Anson | G06F 21/83 726/34 |
| 2008/0036741 A1* | 2/2008 | Hsieh | G06F 3/023 345/168 |
| 2008/0263232 A1* | 10/2008 | Guillot | G06F 21/83 710/11 |
| 2009/0222670 A1* | 9/2009 | Mehta | G06F 1/16 713/186 |

* cited by examiner

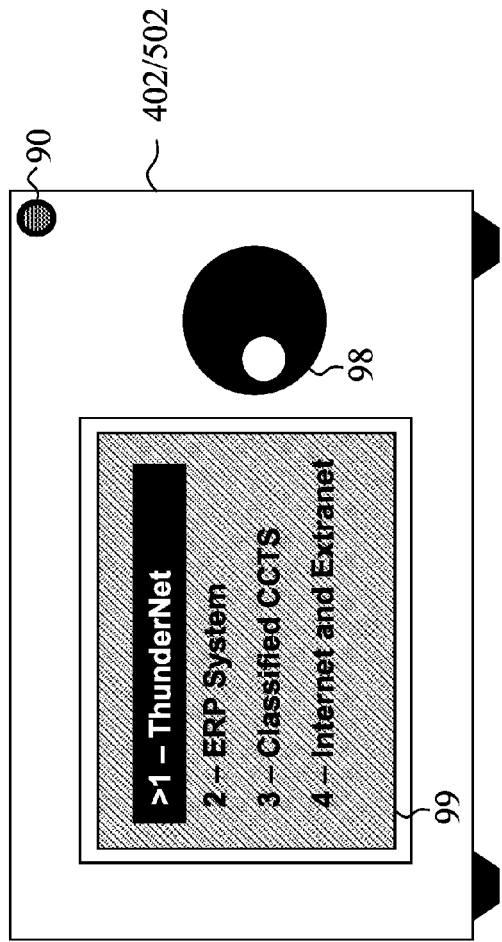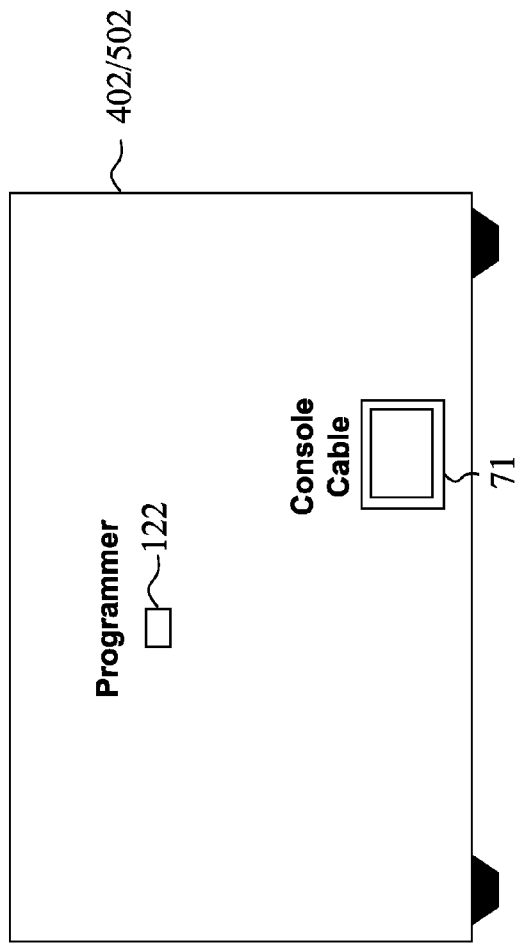
Figure 7a
Figure 7b

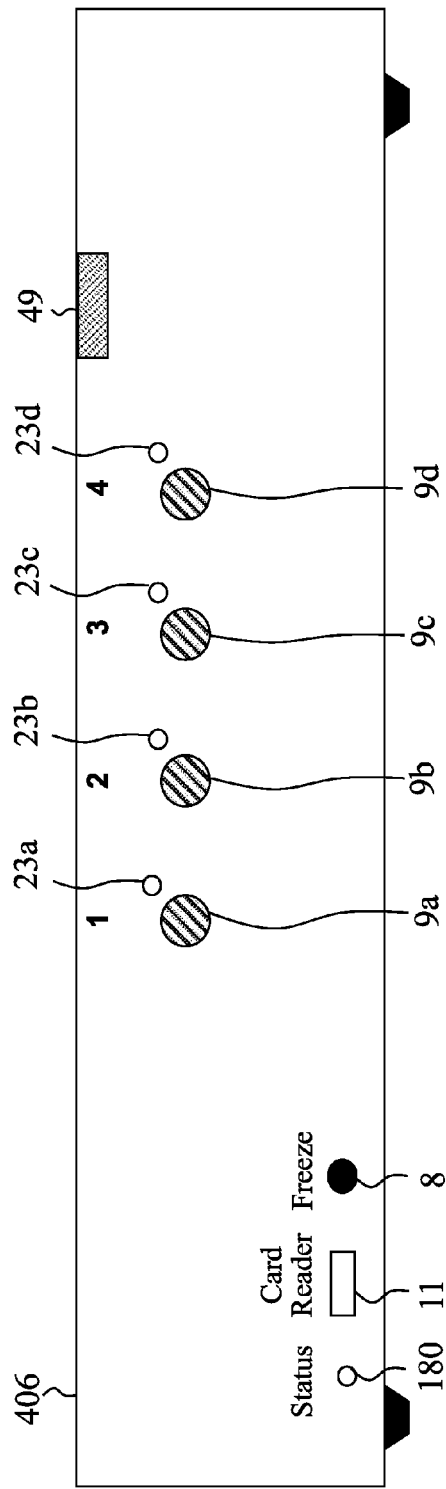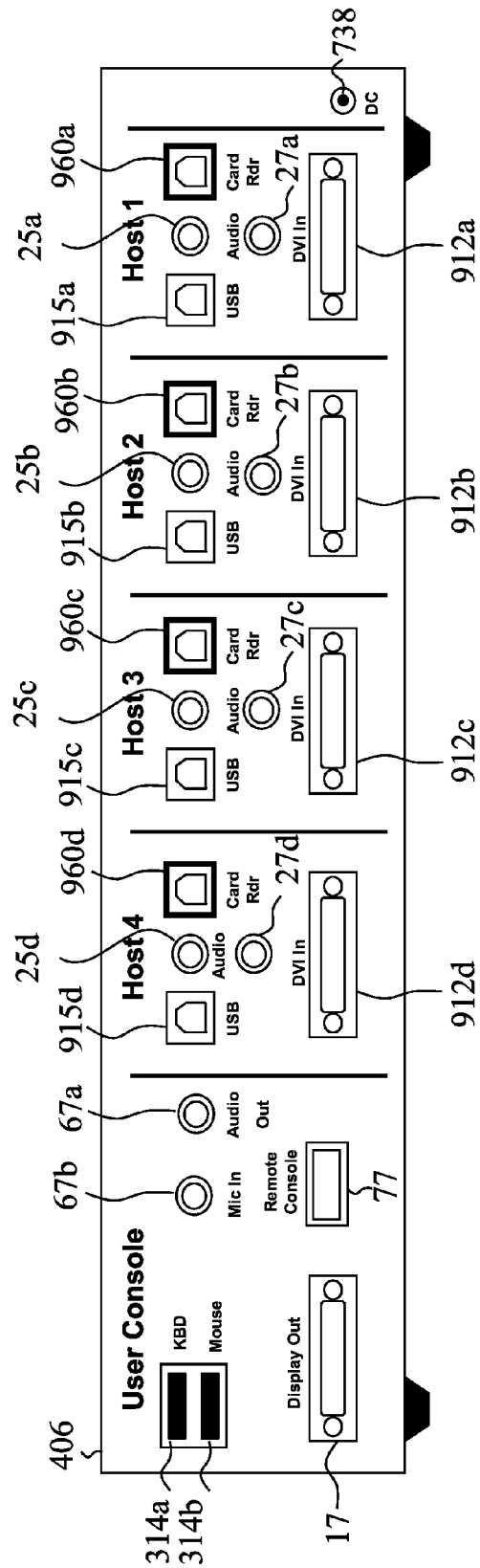

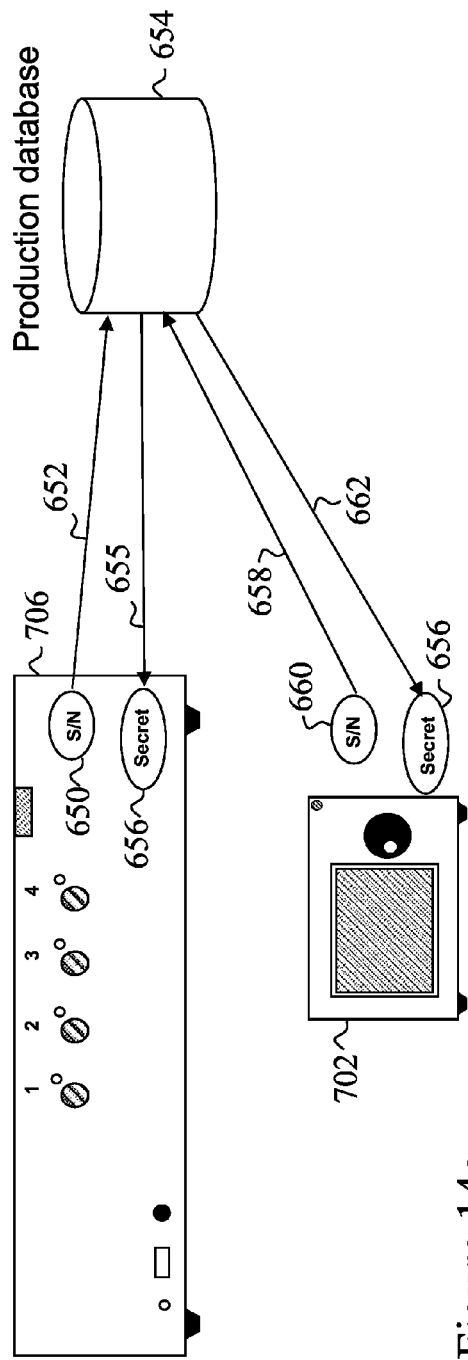
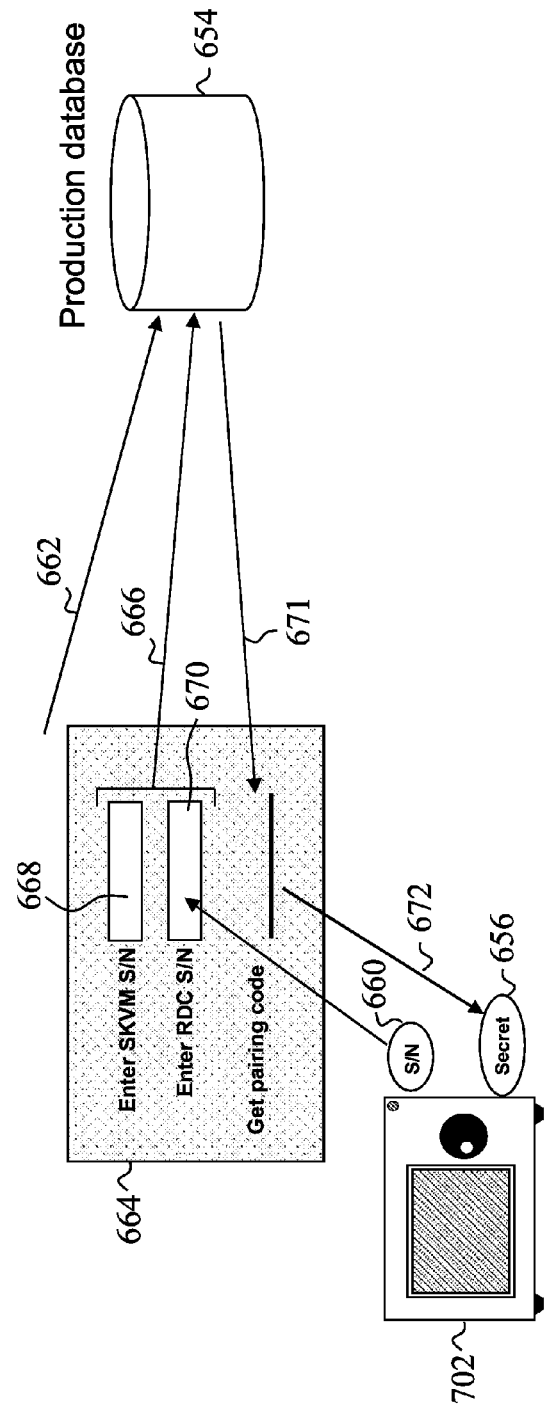
Figure 14a
Figure 14b

SECURED KVM SYSTEM HAVING REMOTE CONTROLLER-INDICATOR

CROSS-REFERENCE TO RELATED APPLICATIONS

This patent application is a Continuation-In-Part of co-pending U.S. patent application Ser. No. 12/711,998, filed Feb. 24, 2010, entitled "Secured KVM System Having Remote Controller-Indicator", which in turn is a continuation of PCT patent application No. PCT/IL 2011/000191, filed Feb. 24, 2011.

FIELD OF THE INVENTION

The present invention generally relates to a Secure KVM switch having a remote controller and indicator more particularly, to a Secure KVM switch capable of securely communicate with a remote console to enable secure remote usage with a plurality of hosts.

DESCRIPTION OF THE RELATED ART

U.S. Patent Publication No. 2008/0288677—"KVM switch system with a simplified external controller" discloses a simple KVM remote controller device. Although this controller may be used with some non-secure KVM products, it lacks the security functions of the present invention and therefore cannot be used in secure systems. Another disadvantage of the disclosed device is that it cannot support user video or peripheral remote extension.

U.S. Patent Publication No. 2002/0056137—"Twisted pair communications line system" discloses a KVM extender over twisted pair cable. While the system disclosed may be used to extend analog video signals it lacks the security and the remote control functions of the KVM.

U.S. Patent Publication No. 2009/0164675—"KVM SWITCH WITH A REMOTE CONTROL INCORPORATING A MEMORY CARD ADAPTER" discloses a KVM setup having a remote control that is based on switch circuitry that selectively electrically connects the set of user interface to hosts. While this setup may be used in low security applications, it is not suitable for use for higher security networks. Electrical connection of hosts to common peripheral devices may result security risks such as data leakage between coupled networks. The disclosed product is targeted to consumers having memory cards to couple with two or more hosts. This particular functionality is regarded as major security vulnerability when used in high security or even enterprise environments.

U.S. Pat. No. 7,259,482—"Distance extender and method making use of same" discloses a KVM system having means to extend the distance between the user console and the hosts. The method disclosed does not offer security needed for secure applications.

Currently available secure KVMs and KVM extenders do not support strong security functions required to enable secure remote operation of the KVM and coupled computers. Moreover, a general KVM or secure KVM of prior-art does not support communication media encryption, mutual authentication and anti-tampering that may be mandatory for high-security applications.

U.S. Provisional Patent Application No. 61/259,692 "Secured KVM system having multiple emulated EDID functions" filed on 10 Nov. 2009 by the inventor of the invention disclosed herein discloses a secure KVM having a remote semaphore or controller indicator. One example embodiment describe a remote controller indicator having one or more selection switches and LCD (Liquid Crystal Display) to display selectable channels.

SUMMARY OF THE INVENTION

Organizations and individuals are faced daily with security attack attempts and cyber-crime. One method large organizations are often used to defend against outside security threats is to physically isolate their internal classified networks from external networks attached to the internet. To enable easy user's access to several networks many organizations are using KVM (Keyboard Video Mouse) devices attached to multiple PCs or thin-clients, each attached to a different network. This method enables users to use a single console (display, keyboard and mouse) to work with several isolated computers. As KVMs may be abused by attackers to bridge or leak between isolated networks, better KVMs have developed over the years with enhanced security. These KVMs are often referred to as Secure KVMs. Secure KVM typically uses isolated circuitry for each computer channel to reduce its vulnerability to leakages between channels. Anti-tampering means are typically built inside Secure KVMs to prevent unauthorized access to internal circuitry.

The use of Secure KVM with multiple isolated hosts requires multiple connection cables to the KVM and multiple LAN connections. The required equipment may take large desktop space, may be vulnerable to security or reliability problems and may generate heat and noise and therefore it may be desired in many cases to install this equipment at a distant location (hidden from the user). To enable remote installation of a KVM with isolated computers a remote Controller-Indicator is needed in order to present to the user the KVM front panel indications and to enable certain control functions. As in Secure KVM system the use of any remote accessory may expose the system to security threats it is desirable that such remote Controller-Indicator will use proper security measures that are compatible with the attached Secure KVM security measures.

KVM remote Controller-Indicator devices of prior-art are lacking the required security measures to enable operation in a secure system. One key aspect missing in these devices is the protection of the communication link between the remote Controller-Indicator and the KVM. A Man-In-the-Middle type of attack may cause the KVM to switch to a different channel without user awareness. This attack may cause data leakages with the use of spoofing method where the user is presented with a fake screen to input critical data on the wrong network.

To further reduce cabling and security vulnerabilities it is desirable that the Secure KVM remote Controller-Indicator will extend the Secure KVM console as well (user display, keyboard, mouse, audio peripherals etc.).

The present invention provides an elegant solution to the shortcomings of the prior art, in that it provides a secure remote Controller-Indicator that enables remote user operation of various KVM functions including secure remote extension of user keyboard, mouse, display, smart-card, channel selection, channel selected display, smart-card status etc.

An object of the present invention is to provide a KVM switch capable of providing secure remote extension of KVM control and indication functions.

Another object of the present invention is to provide a KVM switch having secure remote extension of the complete user console with support of: remote keyboard, mouse, one or more displays, smart-card reader, audio devices, KVM control and KVM monitoring.

It is an object of the current invention to provide a Secured KVM system comprising:

a Secure KVM coupled to a Secure KVM Remote Controller-Indicator wherein the Secure KVM is having:

two or more coupled host computers; and an interface circuitry to link it with said coupled Secure KVM Remote Controller-Indicator, wherein said Secure KVM Remote Controller-Indicator is having: an interface circuitry to link it with said coupled Secure KVM; and a control function capable of enabling a remote user control of said coupled Secure KVM; and an indication function capable of providing a remote user indications of coupled Secure KVM.

In some embodiments, said interface circuitry is further comprising an encryption/Decryption functions to secure the link.

In some embodiments, said interface encryption/decryption functions are based on HASH algorithm to authenticate the Secure KVM Remote Controller-Indicator in front of the coupled Secure KVM and to encrypt at least said control function messages.

In some embodiments, said interface encryption/decryption functions algorithm is more specifically selectable from the list of: SHA-0, SHA-1, SHA-2, SHA-3, SHA-256, SHA-512, SHA-224, SHA-384, DES, Triple DES, AES 128, AES 192, AES 256, MD4 and MD5.

In some embodiments, said Secure KVM and the coupled Secure KVM Remote Controller-Indicator are both sharing the same secret key through a pairing process.

In some embodiments, said pairing process is accomplished through processes selectable from the list comprising: using fixed secret key on Secure KVM for loading same secret key on paired Secure KVM Remote Controller-Indicator, using fixed secret key on Secure KVM Remote Controller-Indicator for loading same secret key on paired Secure KVM or loading secret key on both Secure KVM and on paired Secure KVM Remote Controller/Indicator.

In some embodiments, said remote user control function comprises of pushbuttons to enable remote user selection of coupled Secure KVM channel.

In some embodiments, said remote user control function comprises of a rotary switch to enable remote user selection of coupled Secure KVM channel.

In some embodiments, said remote user indication function comprises of colored light sources.

In some embodiments, said remote user indication function comprises of a visible display selectable from the list of: discrete LEDs, Seven-segments LEDs, small LCD, graphic LCD (dot matrix), Custom LCD, TFT panel, OLED panel.

In some embodiments, said remote user indication alphanumeric display further enables field programming of specific channel names.

In some embodiments, said remote user indication alphanumeric display enables field programming of specific channel background color.

In some embodiments, said remote user indication alphanumeric display circuitry is isolated from said interface circuitry to enhance system security.

In some embodiments, said remote user indication alphanumeric display circuitry is isolated from said interface circuitry to enhance system security.

In some embodiments, said Secure KVM Remote Controller-Indicator is further comprises of anti-tampering circuitry to detect tampering events and to permanently disable Secure KVM Remote Controller-Indicator functionality and indicating tampering event to the user upon such detection.

In some embodiments, said user remote control function is further comprising of means to independently control user authentication means channel selection.

In some embodiments, the system further comprises of circuitry to enable remote connection to coupled Secure KVM of user authentication devices selectable from the list of: smart-card reader, biometric reader and security tokens.

In some embodiments, the system further comprises of circuitry to enable remote connection to coupled Secure KVM of audio peripheral devices selectable from the list of: headset, microphone, speakers and audio amplifier.

In some embodiments, the system further comprising of circuitry to enable remote connection of user peripheral devices selectable from the list of: mouse, trackball, touchscreen, keyboard, and keypad.

In some embodiments, the system further comprising of circuitry to enable remote connection of user devices selectable from the list comprising: mass-storage device, camera, video camera, scanner, printer, and IP phone.

In some embodiments, the system further comprising of circuitry to enable remote connection of one or more user displays.

In some embodiments, interface link physical layer uses one or more cables.

In some embodiments, interface link physical layer is further used to power Secure KVM Remote Controller-Indicator remotely from coupled Secure KVM.

In some embodiments, interface link physical layer uses one or more optical fibers.

In some embodiments, interface link uses one or more wireless links.

In some embodiments, the Secure KVM Remote Controller-Indicator is further comprises of Trusted Platform Module function to secure the Secure KVM Remote Controller-Indicator and the interface link in front of the coupled Secure KVM and its coupled one or more host computers.

It is further provided in accordance with another embodiment, a method for providing remote secure KVM substantially as disclosed herein.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural, logical or method steps details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
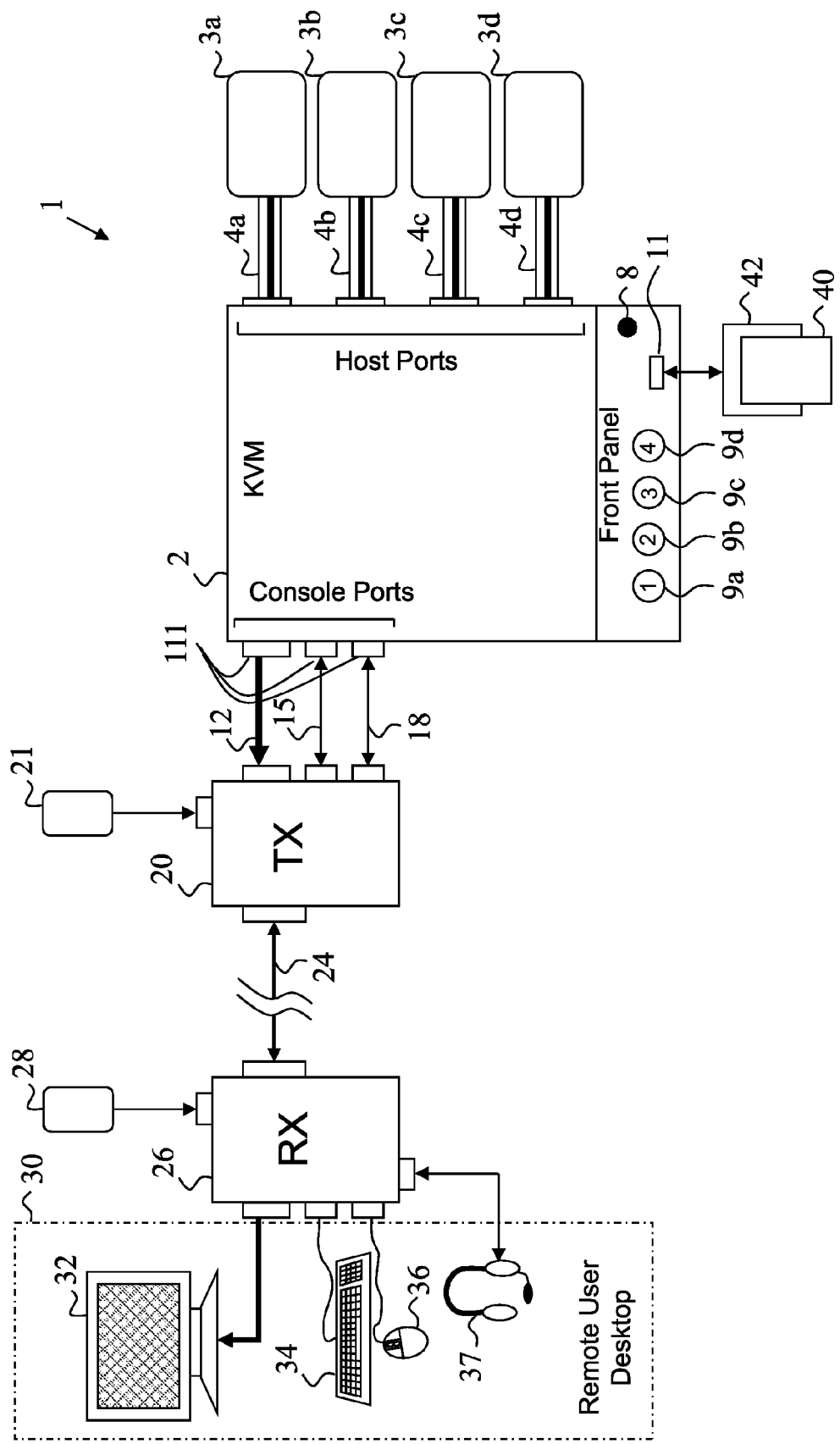

FIG. 1 illustrates a high-level block-diagram of a prior art system that enables a remote computer user to access multiple networks through a KVM attached to multiple host computers and KVM extender.

Figure 2:
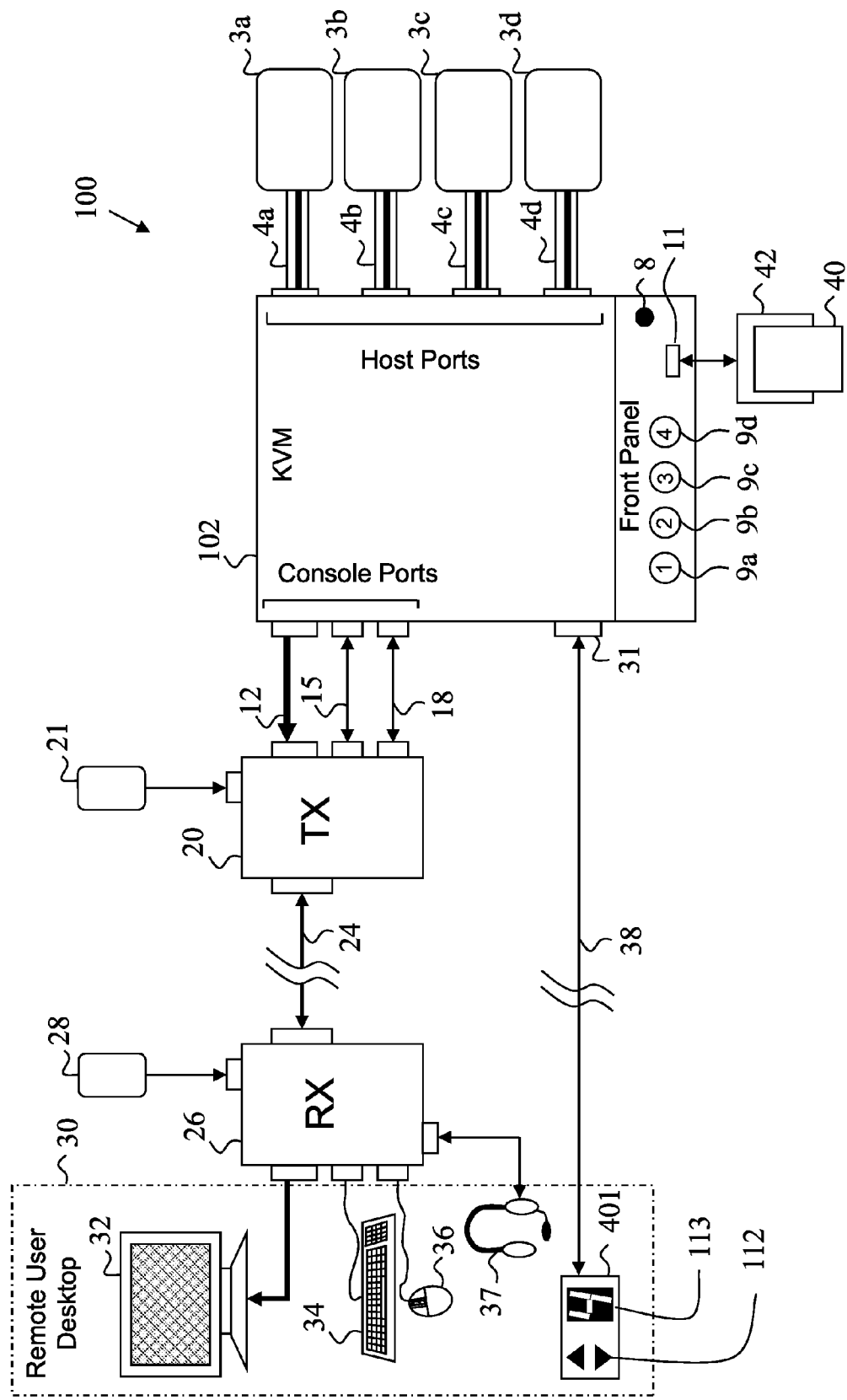

FIG. 2 illustrates a high-level block-diagram of yet another prior art system that enables a remote computer user to access multiple networks through a KVM attached to multiple host computers and KVM extender. In this prior-art system user can remotely control and monitor KVM selected channel through remote controller/indicator.

Figure 3:
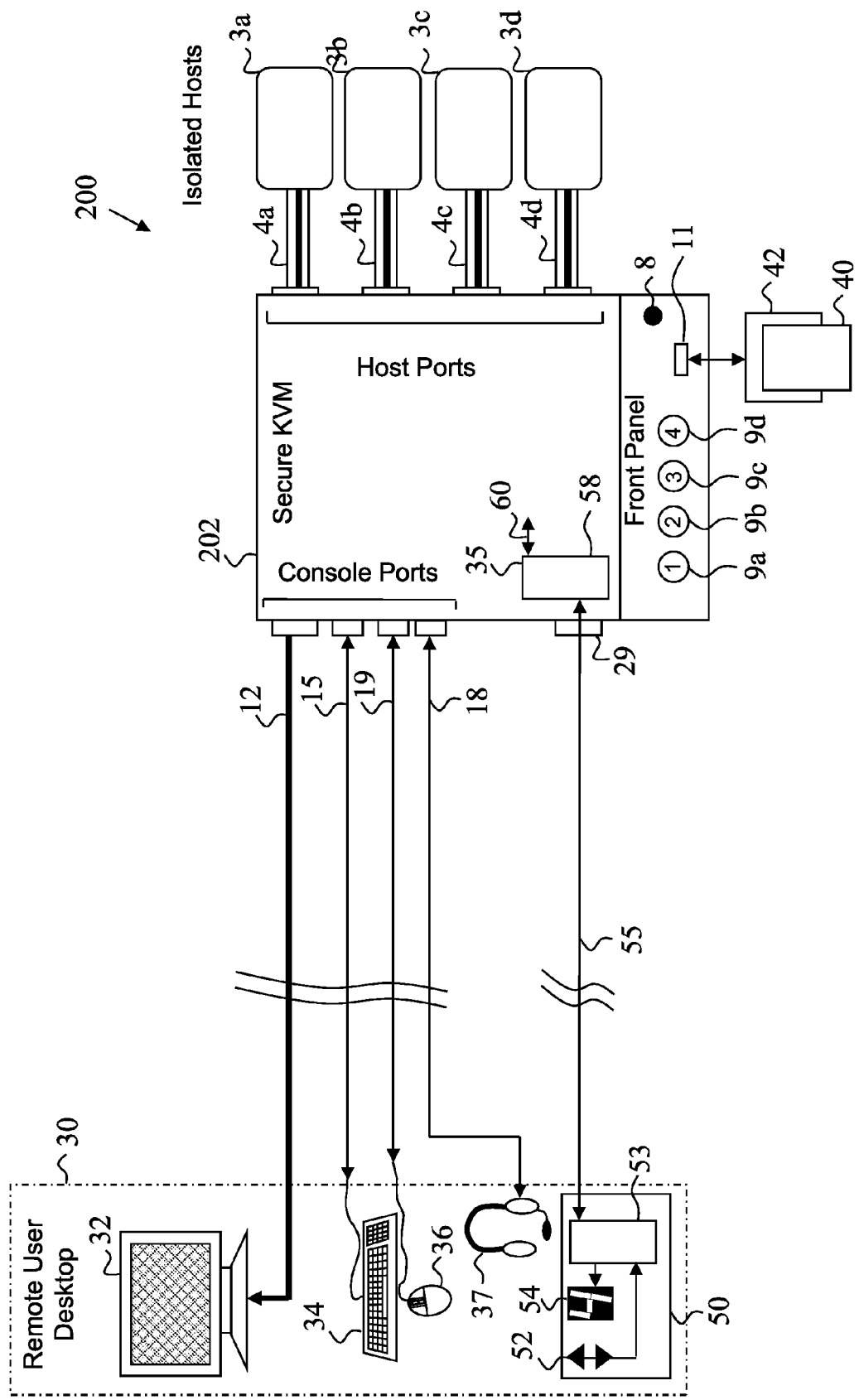

FIG. 3 illustrates a high-level block-diagram of an exemplary embodiment of the present invention that enables a remote computer user to securely access multiple isolated networks using a Secure KVM attached to four host computers and a Secure KVM Remote Controller-Indicator device having encryption and authentication functions.

Figure 4:
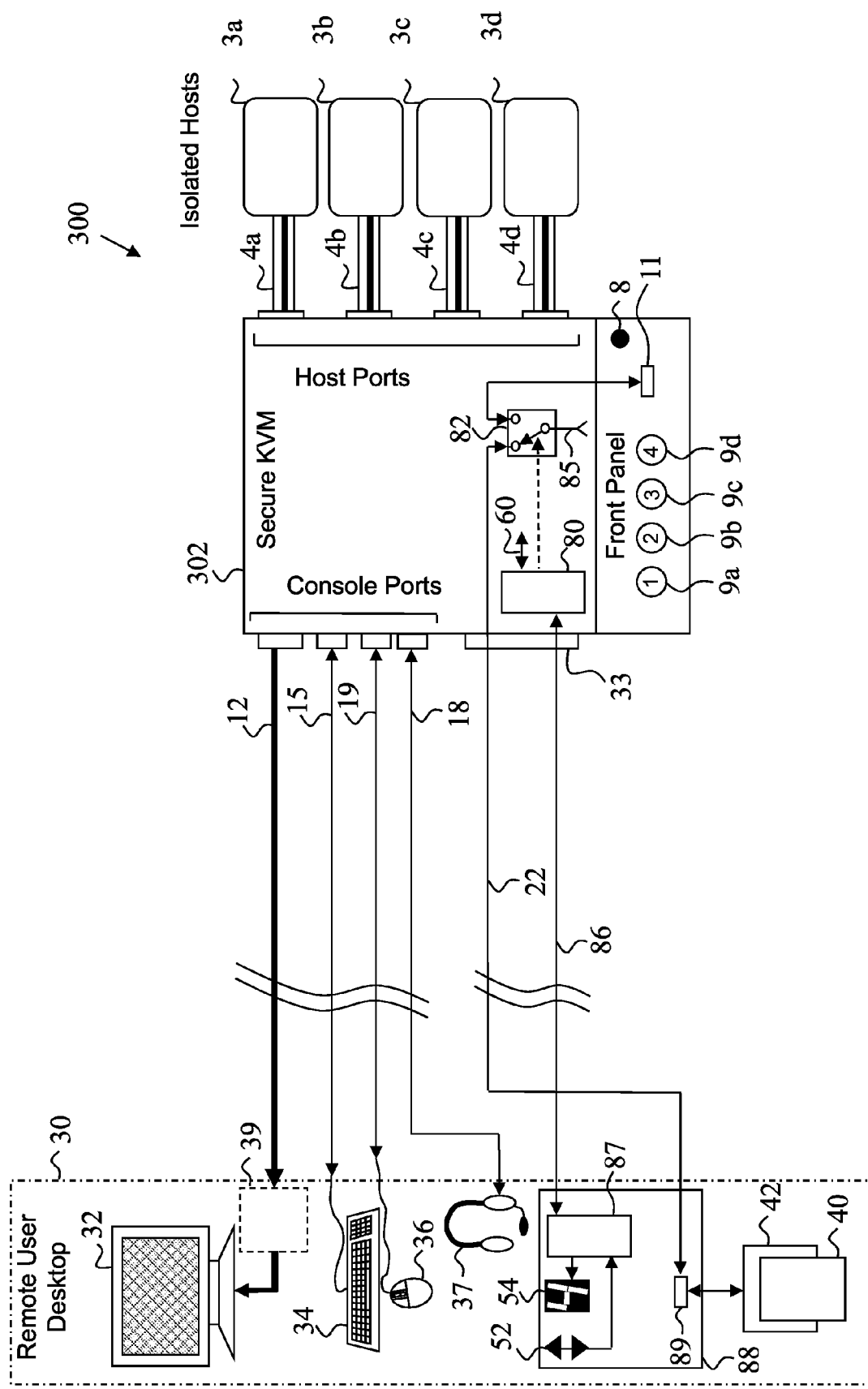

FIG. 4 illustrates a high-level block-diagram of another exemplary embodiment of the present invention having a Secure KVM Remote Controller-Indicator device with encryption, authentication and remote smart-card functions.

Figure 5:
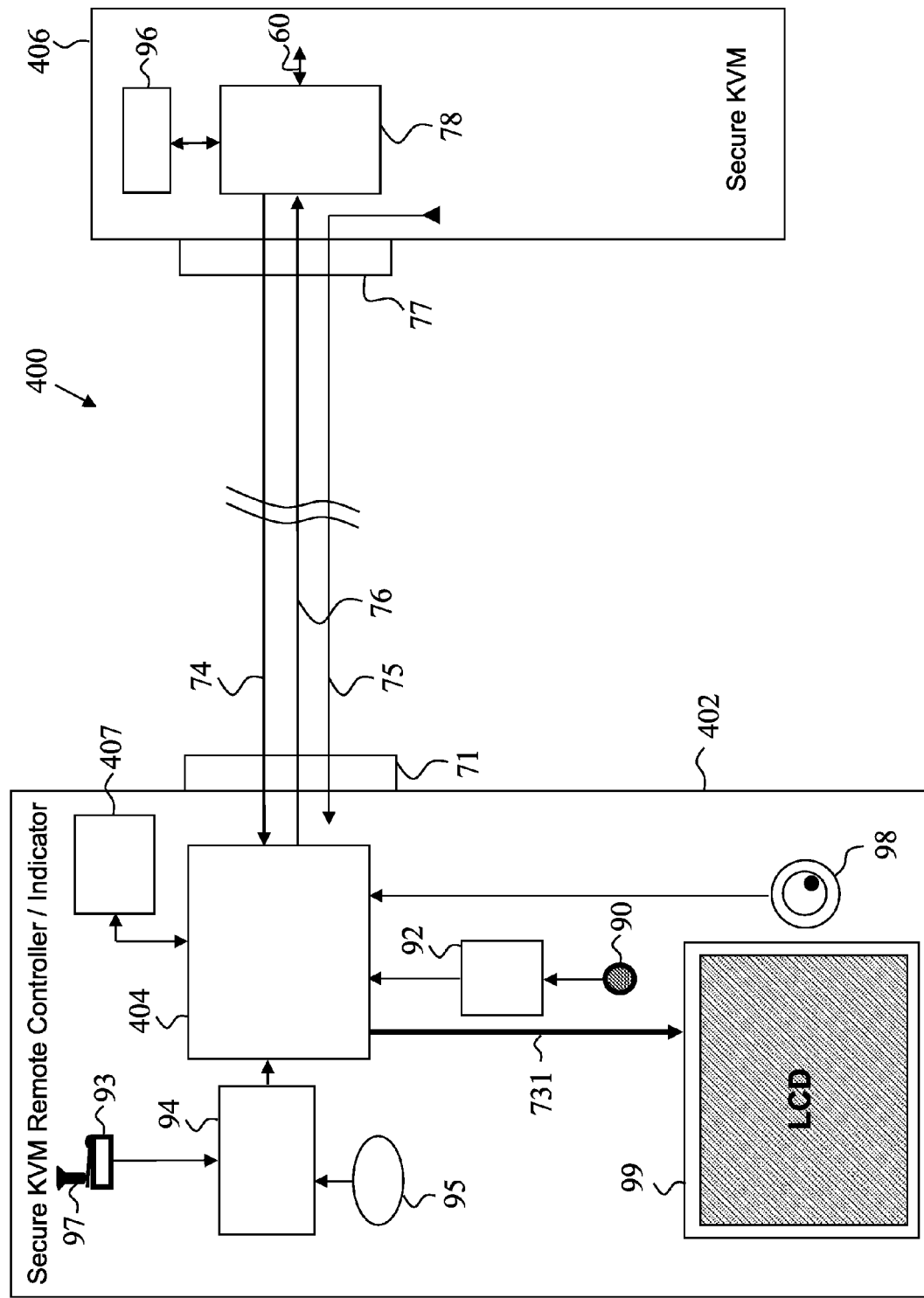

FIG. 5 illustrates a high-level block-diagram of yet another exemplary embodiment of the present invention having a Secure KVM Remote Controller-Indicator device with graphic LCD, rotary encoder and anti-tampering function.

Figure 6:
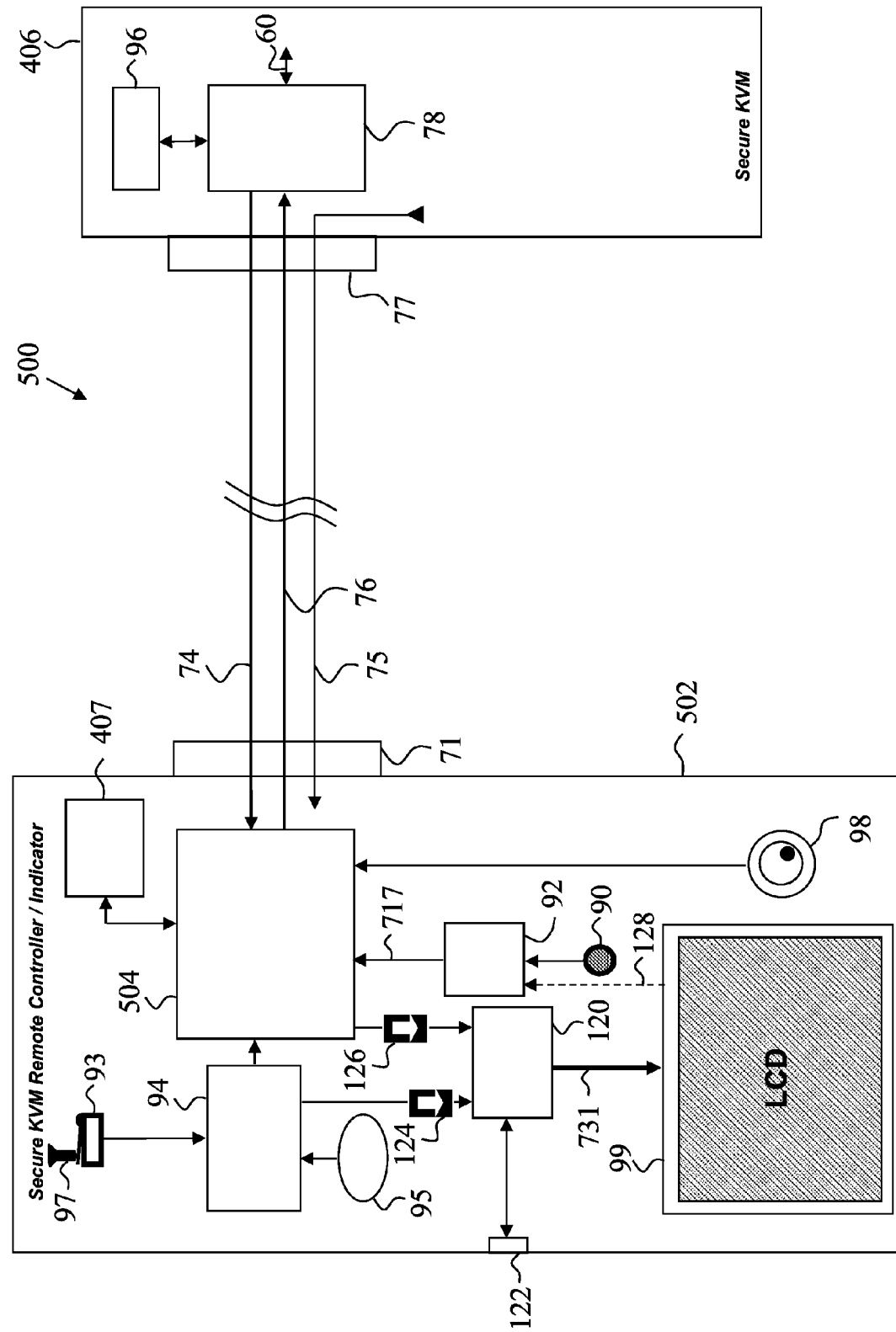

FIG. 6 illustrates a high-level block-diagram of another exemplary embodiment of the present invention similar to FIG. 5 above having a Secure KVM Remote Controller-Indicator device with graphic LCD driven by an isolated microcontroller.

FIGS. 7a and 7b illustrate examples of the front panel (7a) and back panel (7b) of a Secure KVM Remote Controller-Indicator described in FIGS. 5 and 6 according to the present invention.

FIGS. 8a and 8b illustrate examples of the front panel (8a) and back panel (8b) of a Secure KVM described in FIGS. 5 and 6 according to the present invention.

Figure 9:
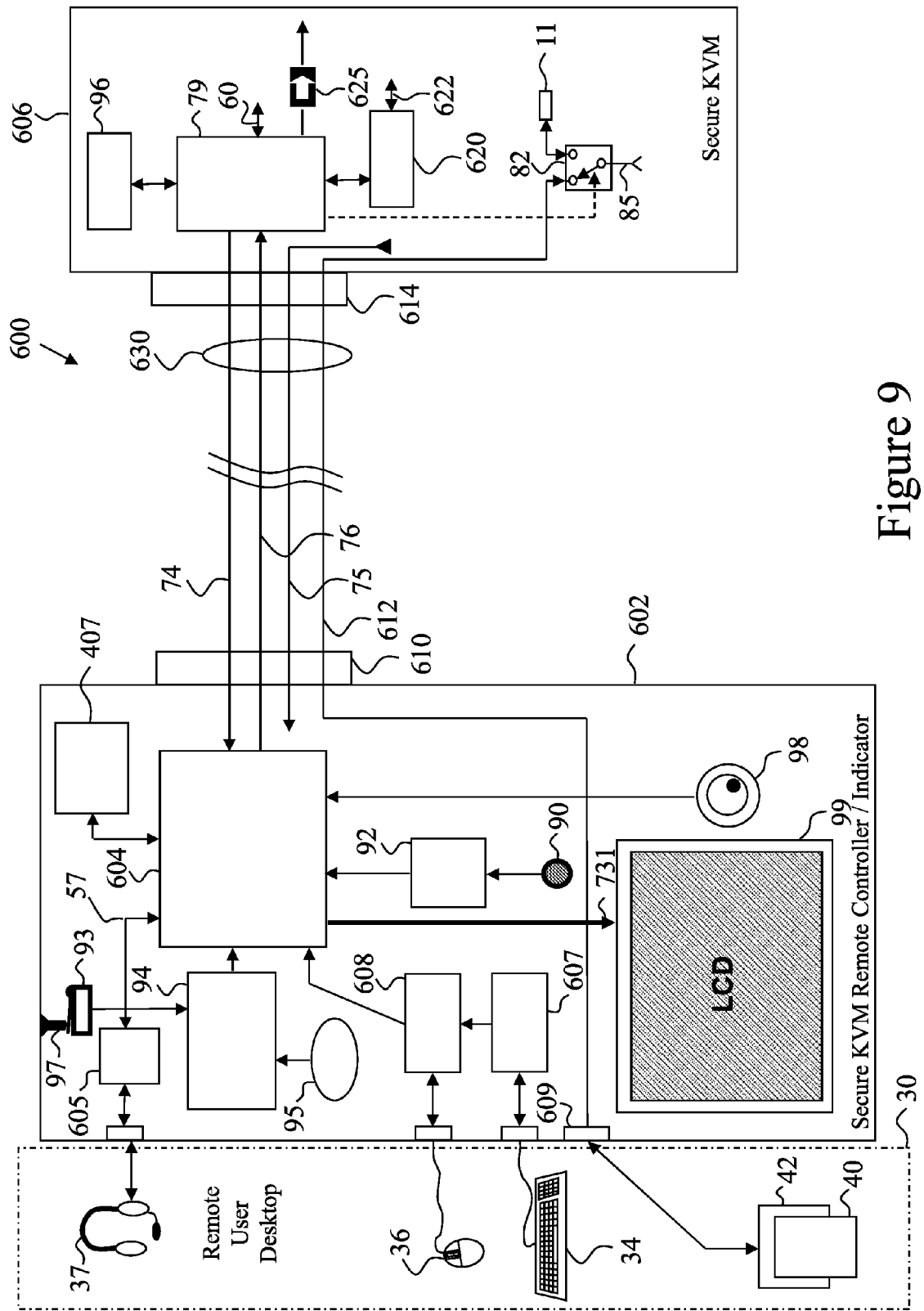

FIG. 9 illustrates a high-level block-diagram of another exemplary embodiment of the present invention similar to FIG. 6 above having an additional remote extension of keyboard, mouse, headset, and smart-card reader.

Figure 10:
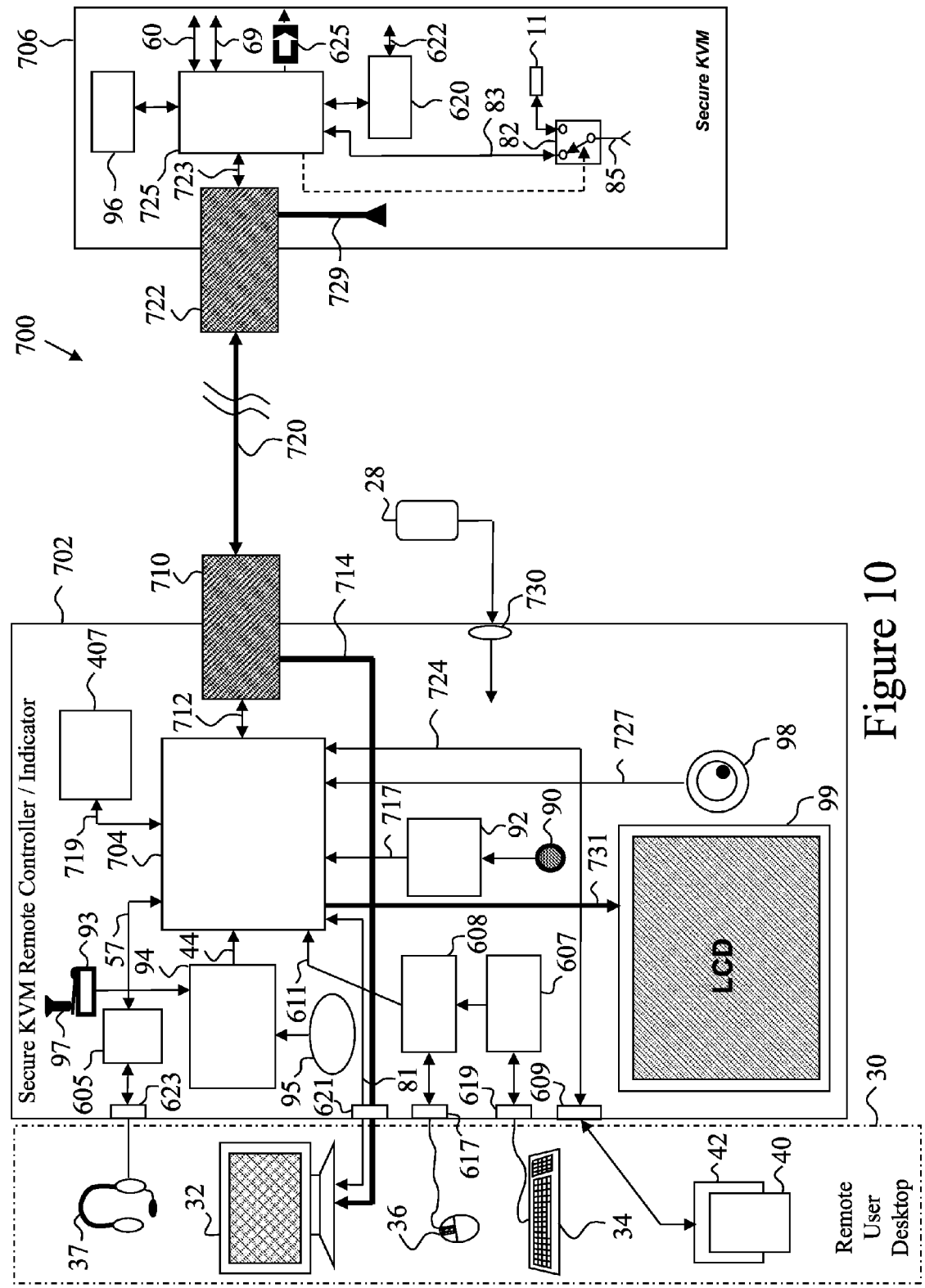

FIG. 10 illustrates a high-level block-diagram of another exemplary embodiment of the present invention similar to FIG. 9 above having an additional remote extension of user console display.

Figure 11:
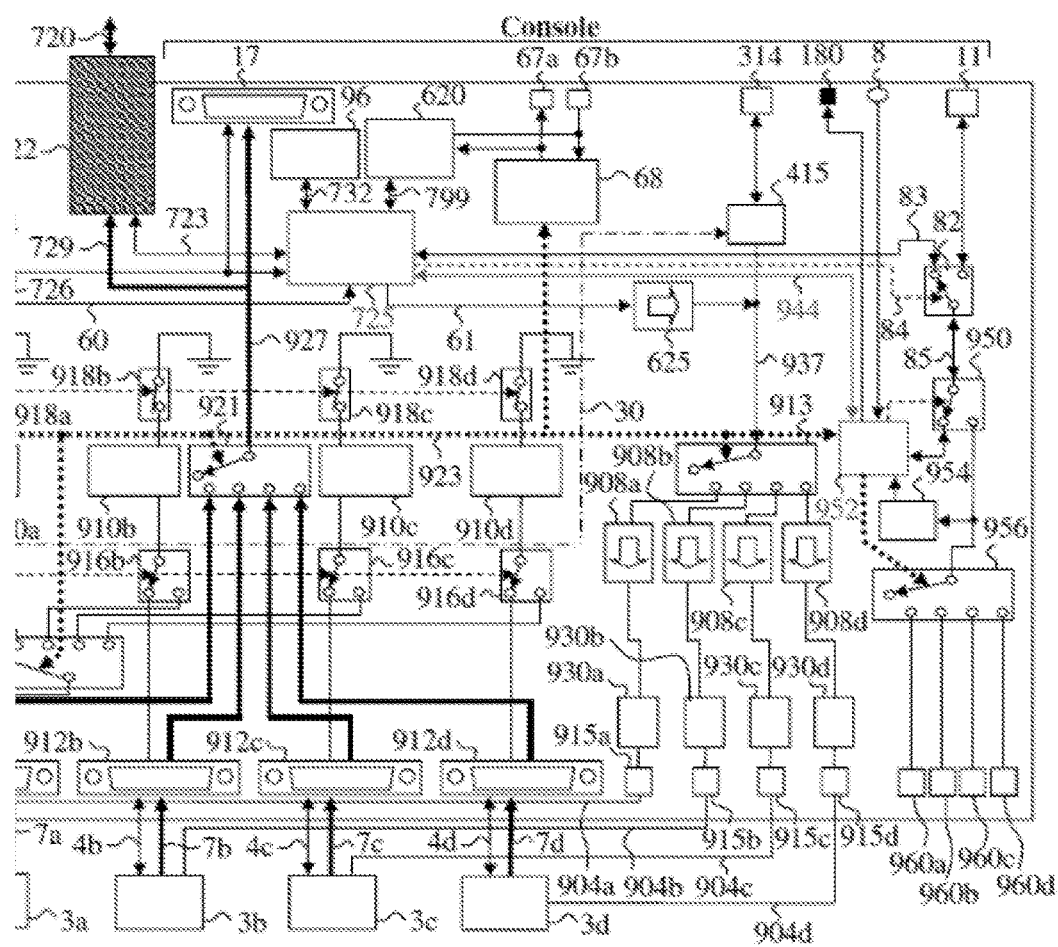

FIG. 11 illustrates a high-level block-diagram of the Secure KVM of the exemplary embodiment shown in FIG. 10.

Figure 12:
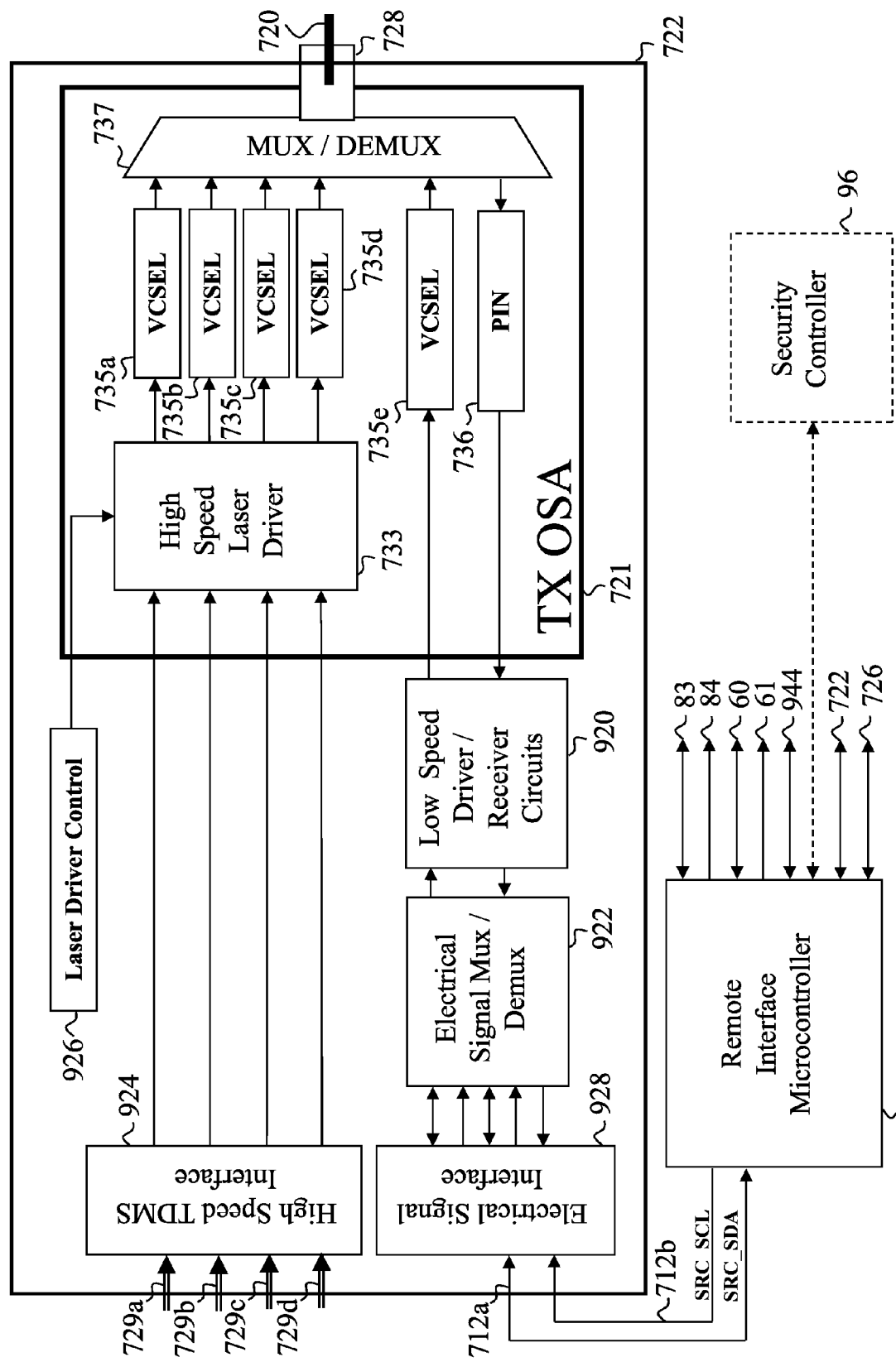

FIG. 12 illustrates more detailed block diagram of the fiber optics remote interface sub-system of Secure KVM illustrated in FIG. 11.

Figure 13:
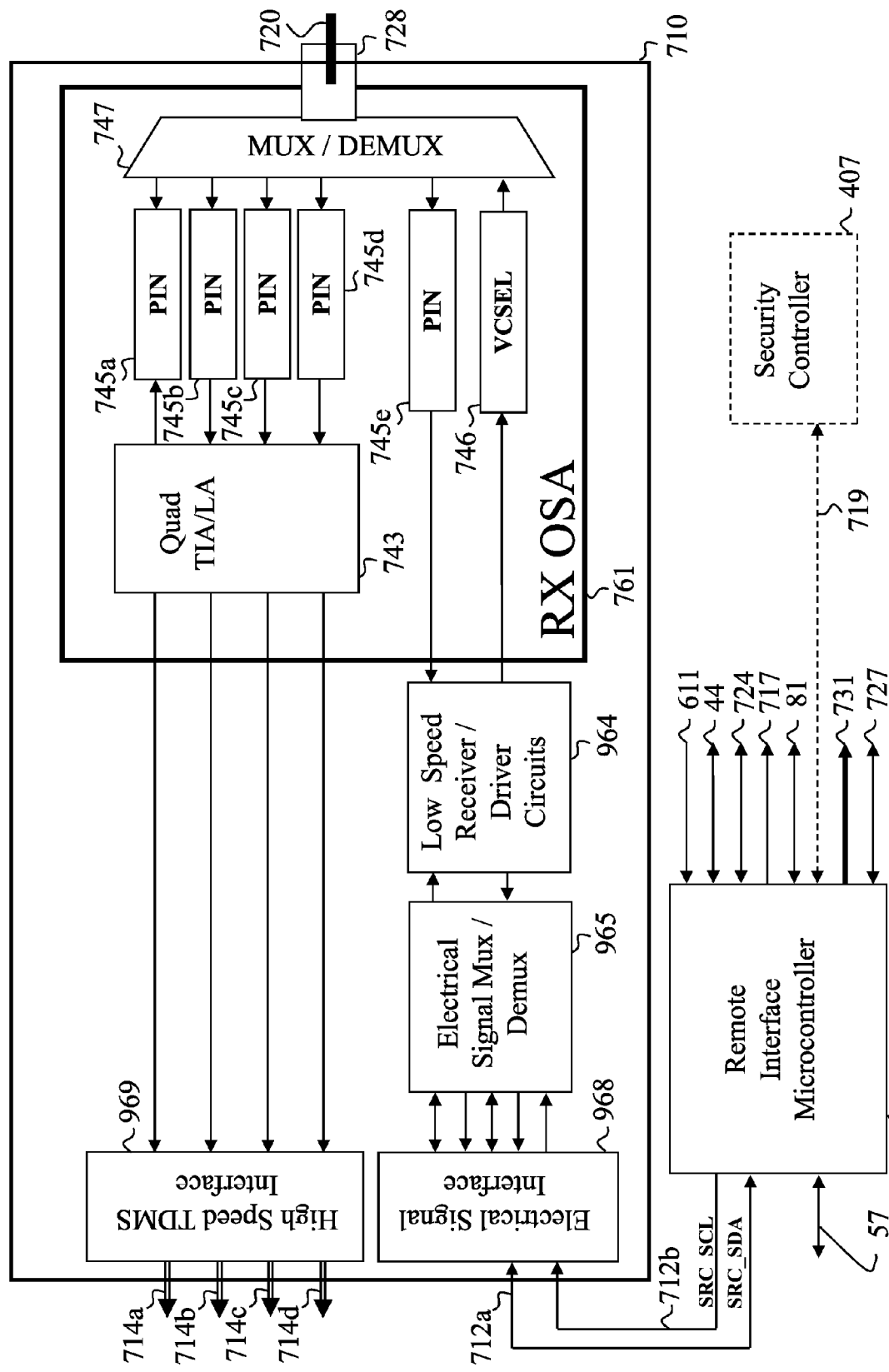

FIG. 13 illustrates more detailed block diagram of the fiber optics remote interface sub-system of the Secure KVM Remote Controller-Indicator illustrated in FIG. 9.

FIG. 14a illustrates a simplified block diagram of the production pairing process of the Secure KVM and the coupled Secure KVM Remote Controller-Indicator of the present invention.

FIG. 14b illustrates a simplified block diagram of the field pairing process of the Secure KVM and the coupled Secure KVM Remote Controller-Indicator of the present invention.

Figure 15:
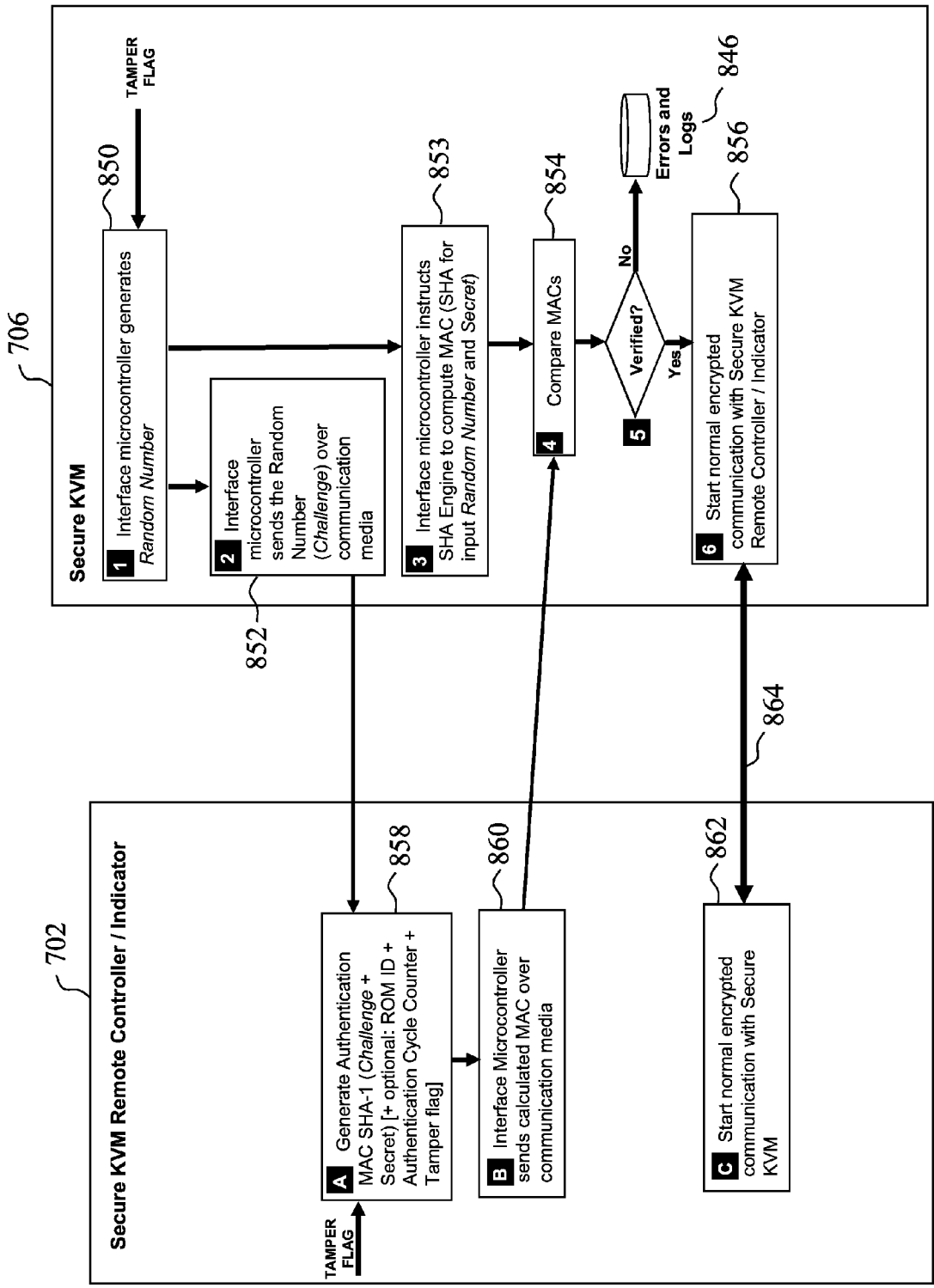

FIG. 15 illustrates a block diagram of an exemplary embodiment of a mutual authentication process that may be used by a Secure KVM of the present invention to authenticate coupled Secure KVM Remote Controller/Indicator.

Figure 16:
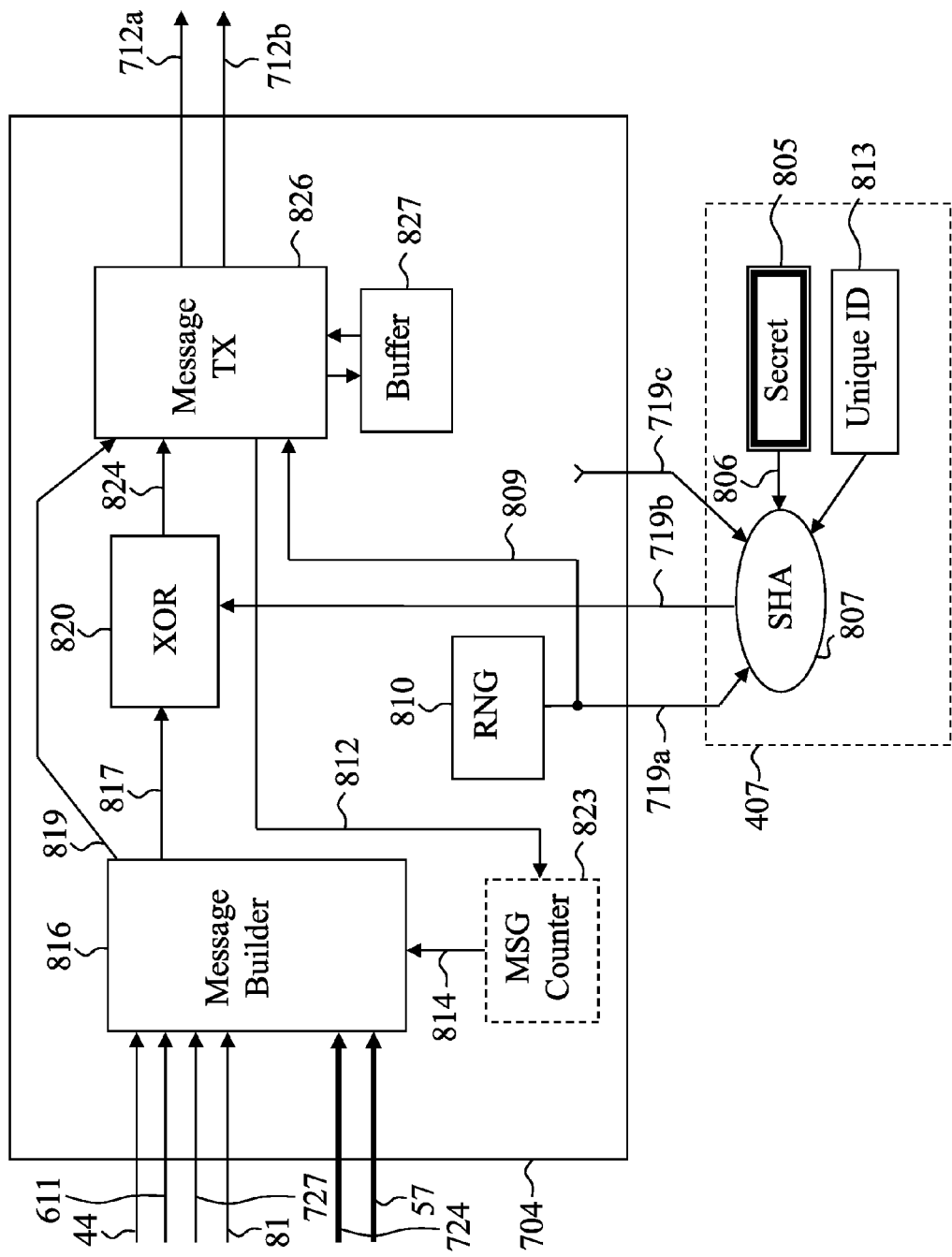

FIG. 16 illustrates a block diagram of the data processing encryption and transmission from Secure KVM Remote Controller-Indicator to coupled Secure KVM of FIGS. 10 to 13 according to an exemplary embodiment of the present invention.

Figure 17:
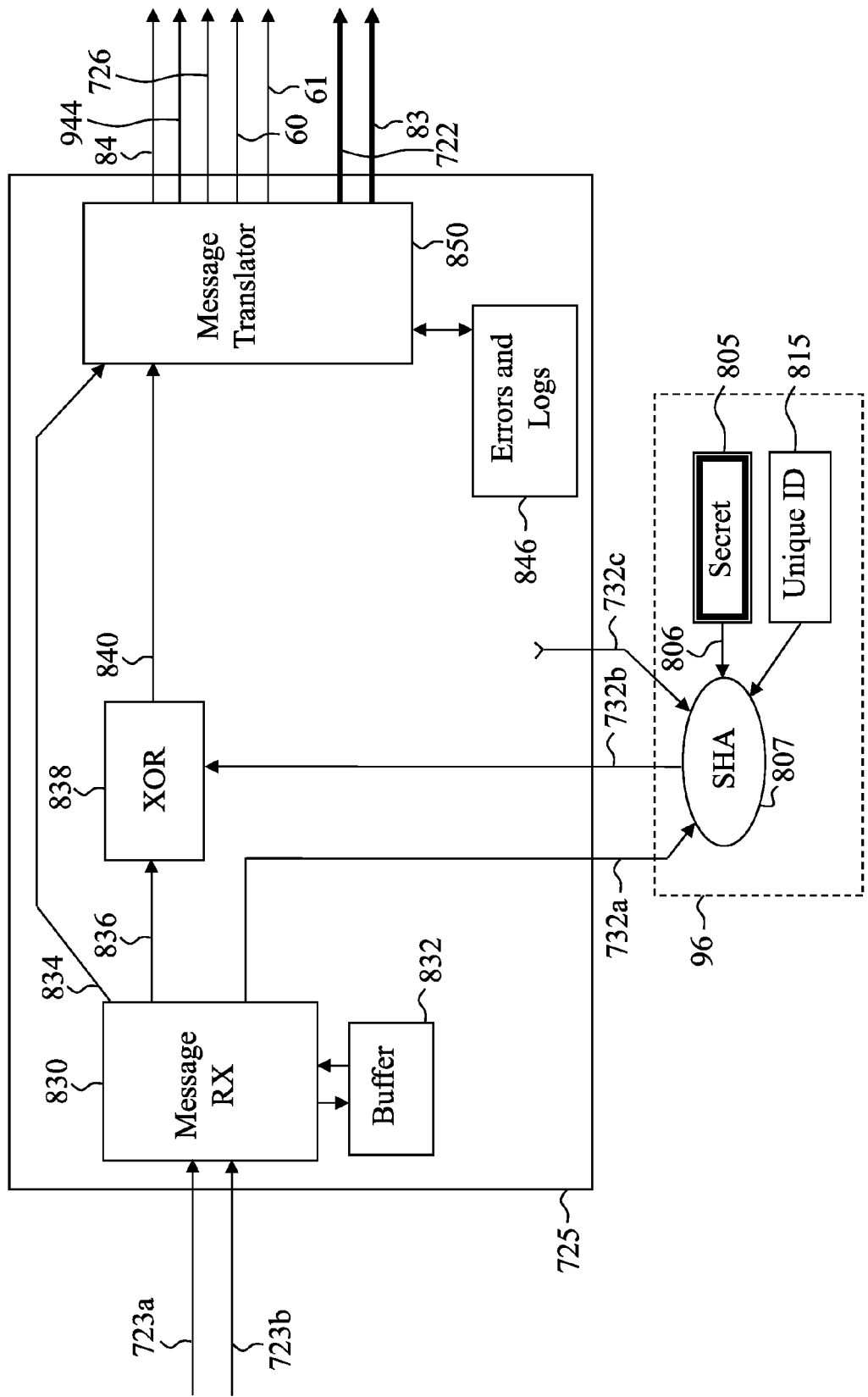

FIG. 17 illustrates a block diagram of Secure KVM data receiving, processing and decryption from Secure KVM Remote Controller-Indicator of FIGS. 10 to 13 according to an exemplary embodiment of the present invention.

Figure 18A:
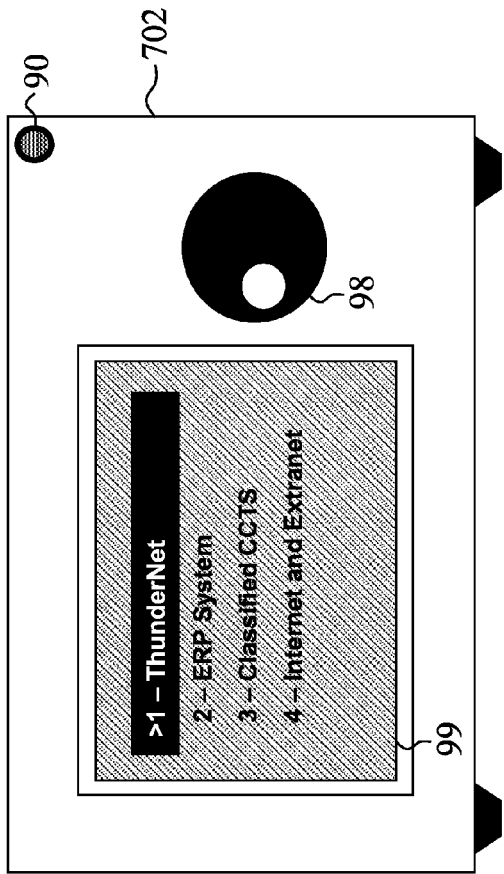
Figure 18B:
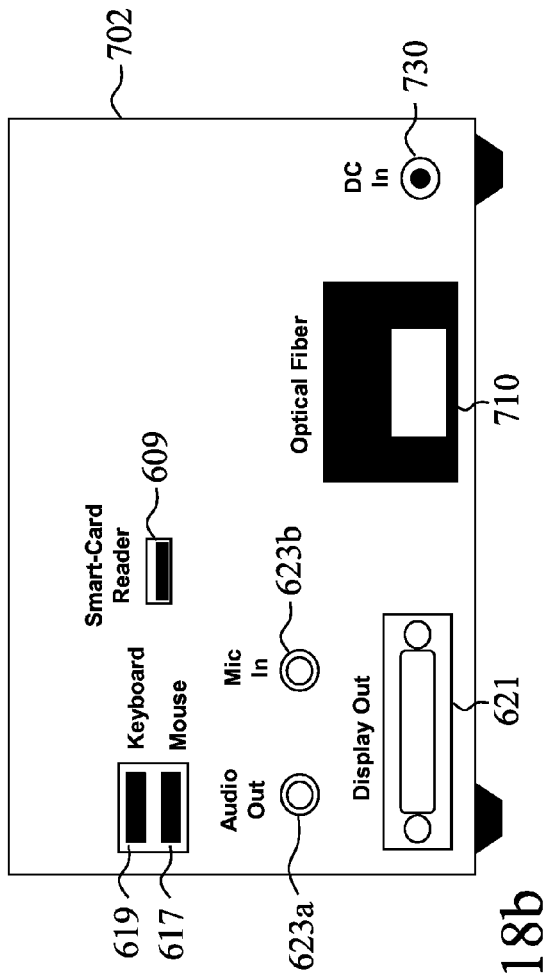

FIGS. 18a and 18b illustrate examples of the front panel (18a) and back panel (18b) of a Secure KVM Remote Controller-Indicator described in FIGS. 10 to 17 according to the present invention.

Figure 19A:
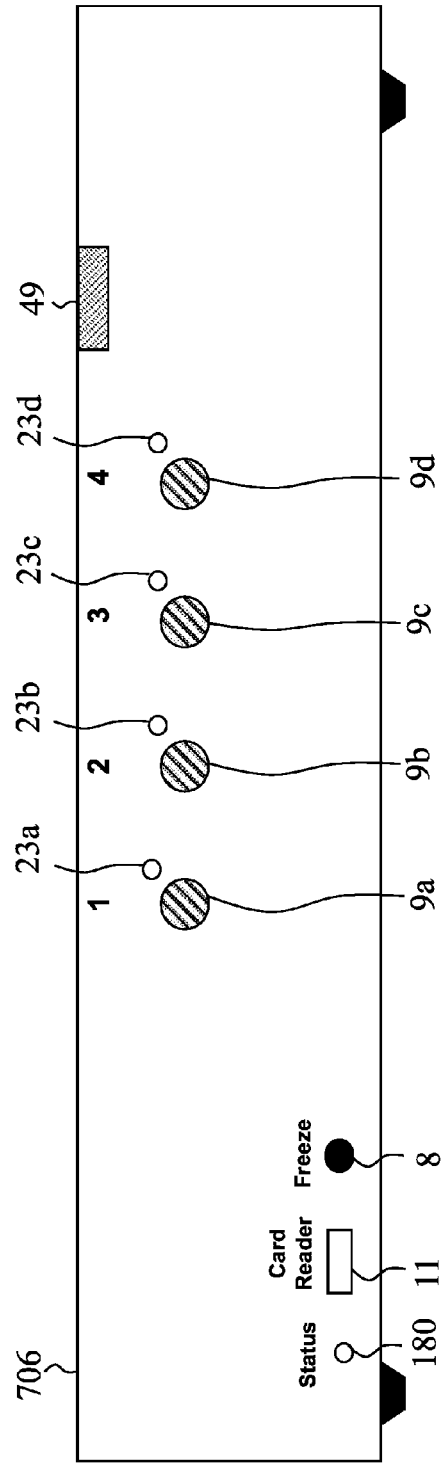
Figure 19B:
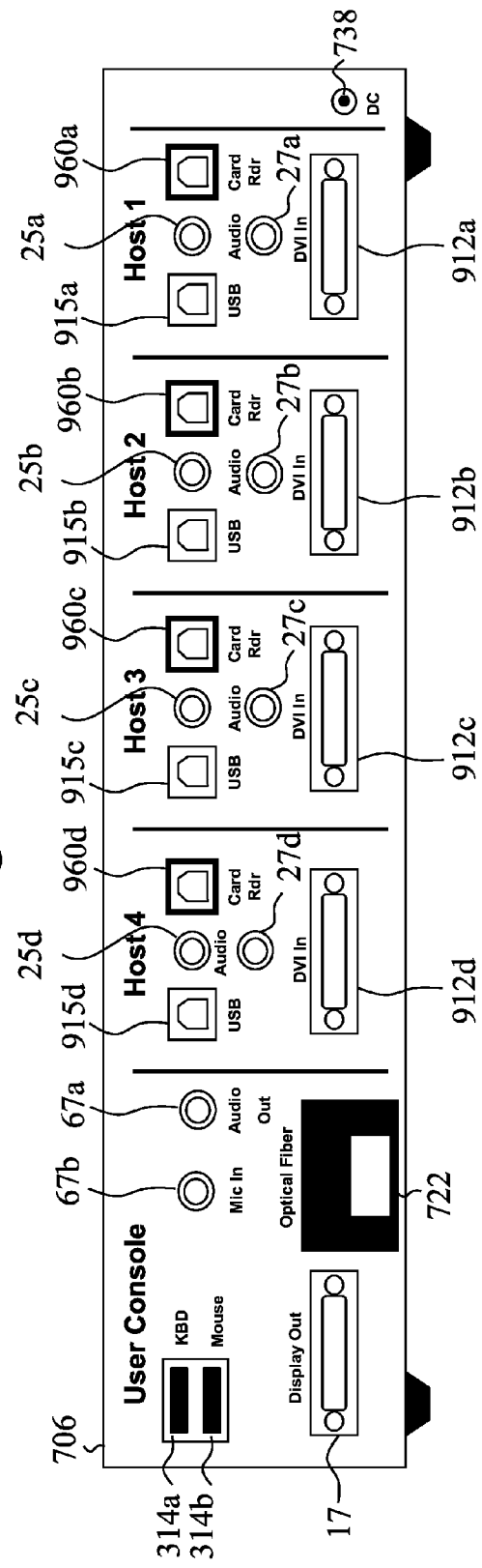

FIGS. 19a and 19b illustrate examples of the front panel (19a) and back panel (19b) of a Secure KVM described in FIGS. 10 to 17 according to the present invention.

FIGS. 20a to 20f illustrate examples of possible implementation of Secure KVM Remote Controller-Indicator channel selection process and tampering indication.

Figure 21:
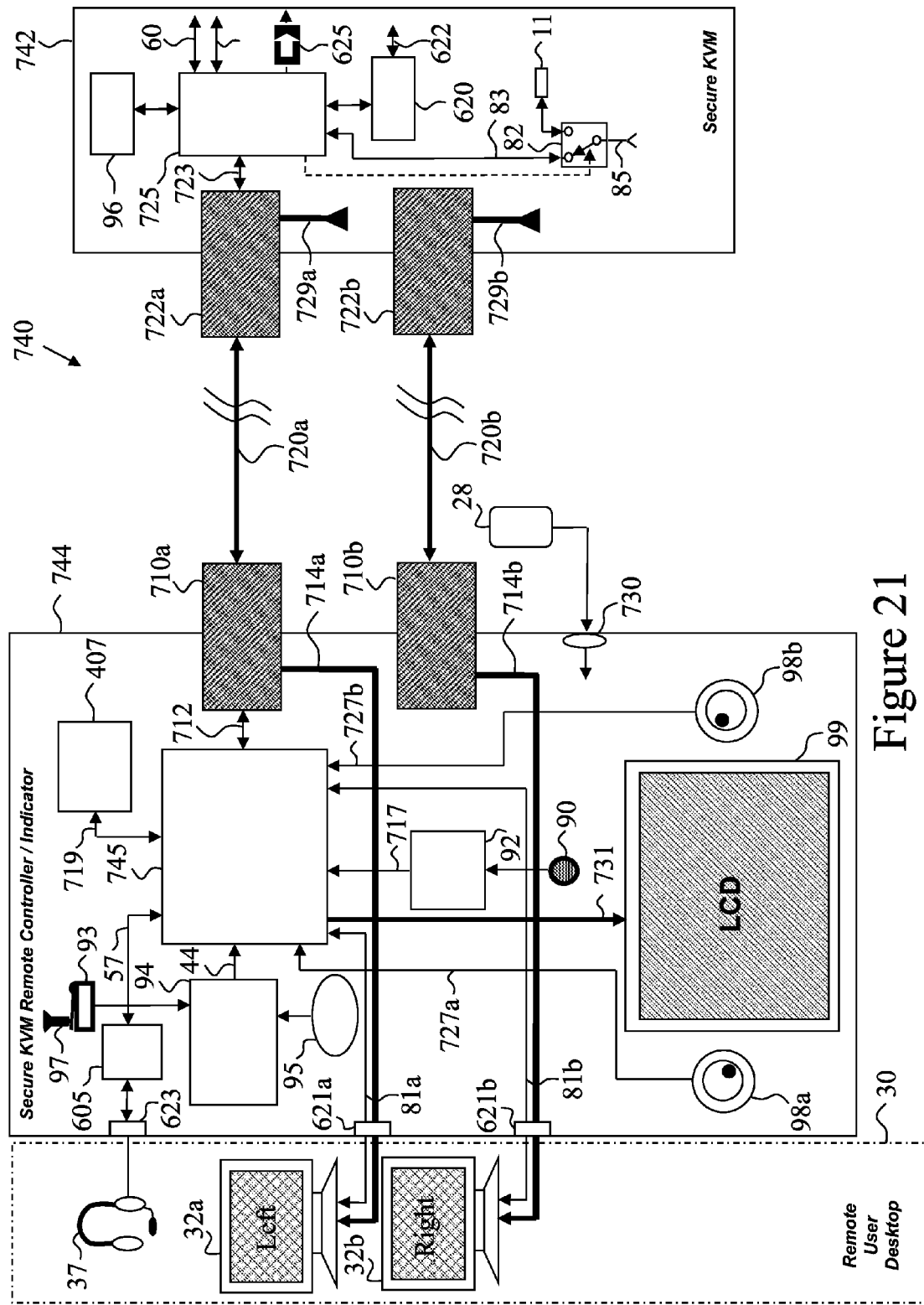

FIG. 21 illustrates a high-level block diagram of yet another example of multiple hosts and a Secure KVM system of the present invention similar to the system of FIG. 10 above having dual remote displays.

Figure 22A:
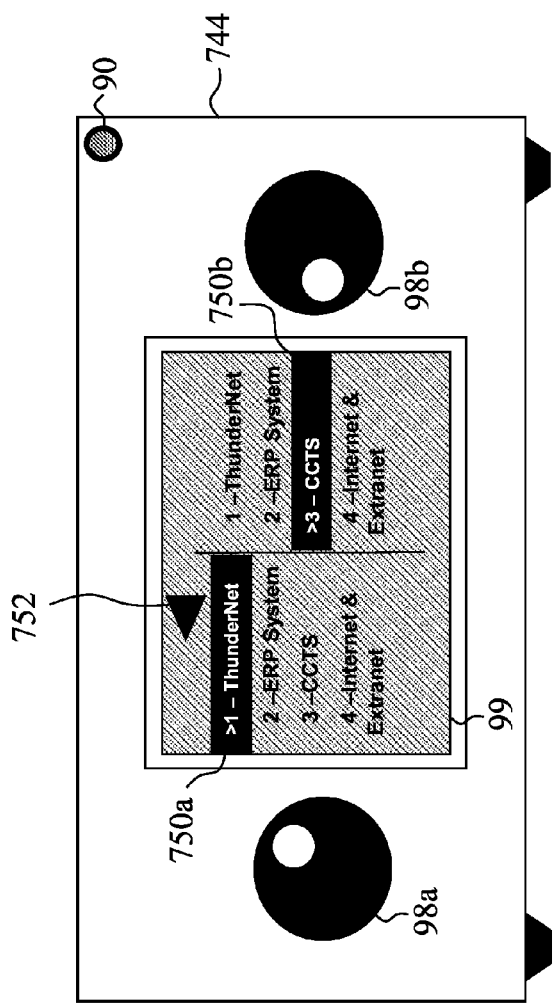
Figure 22B:
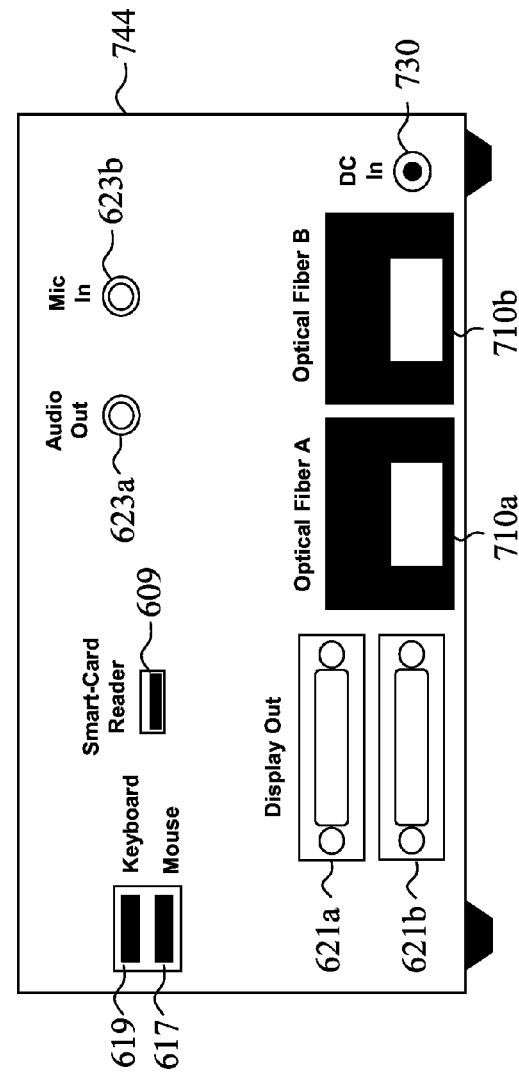

FIGS. 22a and 22b illustrate examples of the front panel (22a) and back panel (22b) of a dual displays Secure KVM Remote Controller-Indicator described in FIG. 21 according to the present invention.

Figure 23:
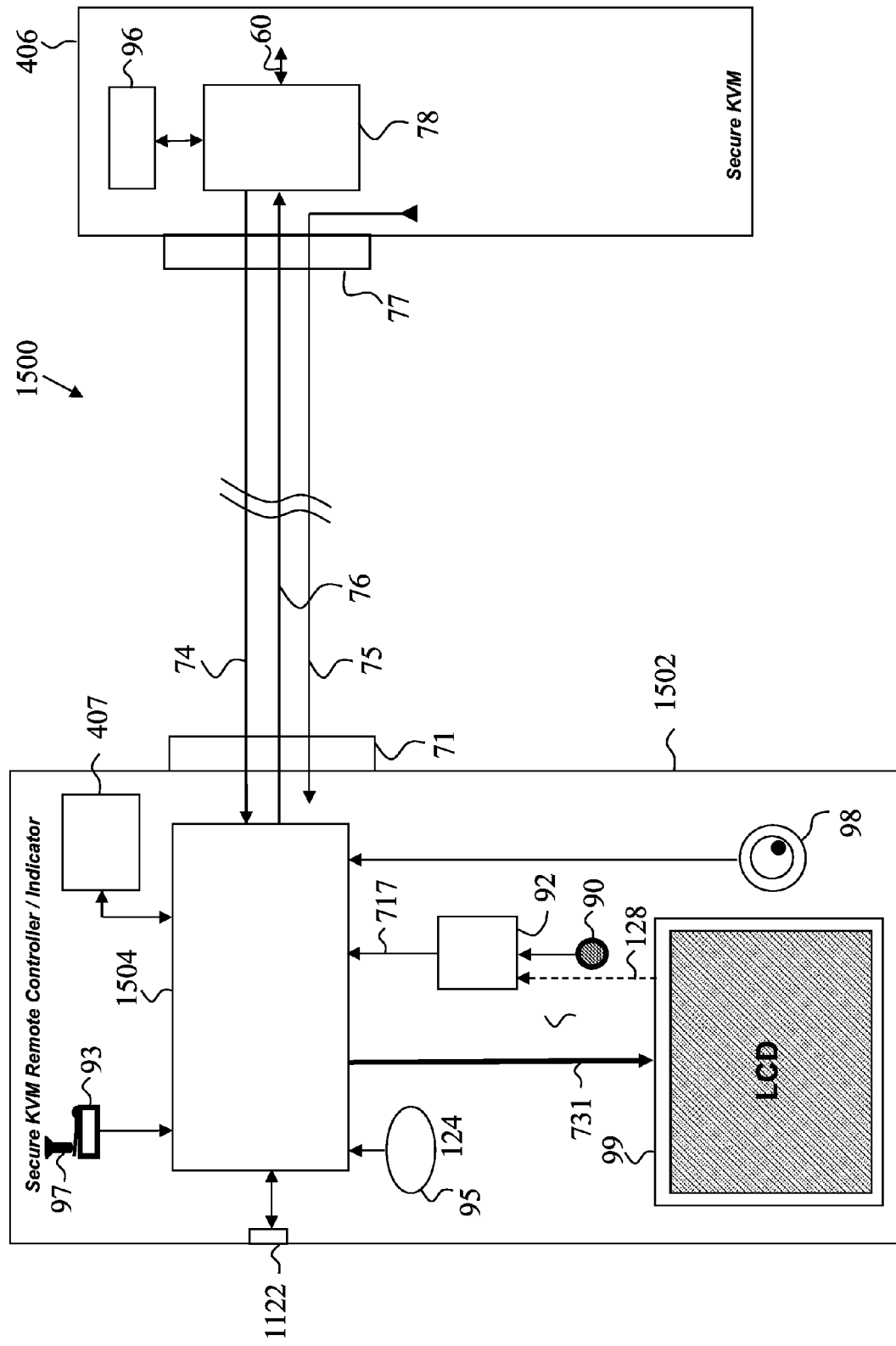

FIG. 23 illustrates a high-level block diagram of yet another example of a Secure KVM system of the present invention in which the number of components in the remote controller was reduced.

Figure 24:
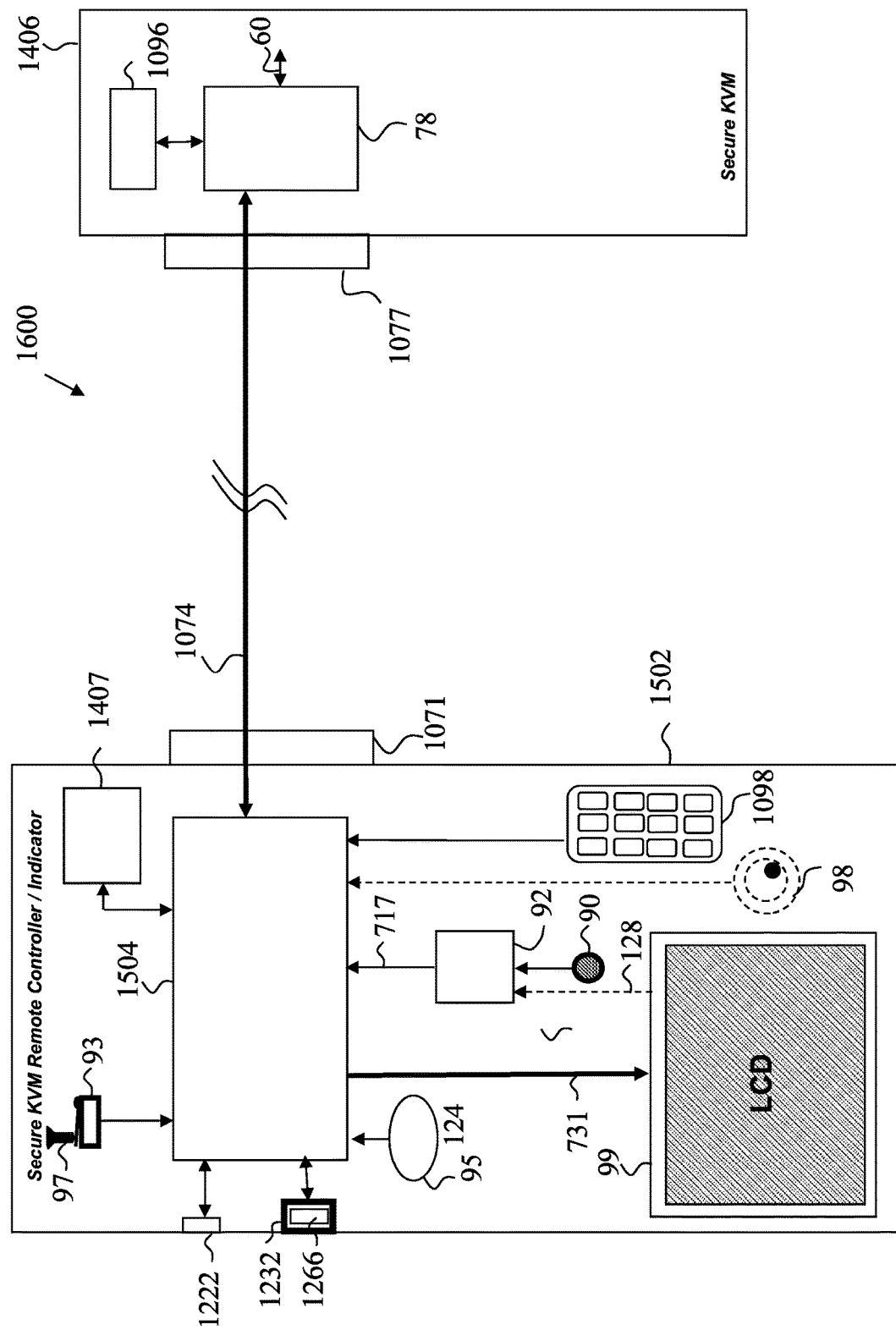

FIG. 24 illustrates a high-level block diagram of yet another example of a Secure KVM system of the present invention.

DETAILED DESCRIPTION OF THE EMBODIMENTS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

In the drawings, some logical connections are drawn as arrows indicating the direction of data flow. Some connections are specifically marked with two ends arrow to indicate bi-directional data flow. However, some bidirectional data connections are drawn without arrow heads as to not crowd the drawings. Video data channels may be drawn in heavy lines to indicate the higher bandwidth of these channels. Arrows drawn within switches boxes should not be interpreted as indicating direction of data flow.

FIG. 1 illustrates a high-level block diagram presenting an example of a prior-art remote-located multiple hosts and KVM system 1. This system implementation lack the security features that typically required in applications where hosts must be isolated due to security reasons. The term isolated refers to the high-level of assurance that data may not leak from one host to another through the KVM.

In this system host computers (or hosts) 3a, 3b, 3c and 3d are connected to the KVM 2 through four KVM host cables 4a, 4b, 4c and 4d respectively. Each one of the KVM host cables 4a to 4d typically comprises of bundled USB, video and audio lines.

KVM 2 front panel push-buttons 9a to 9d enable user selection of hosts 3a to 3d respectively.

Dedicated Peripheral Port (DPP) or Common Access Card (CAC) or smart-card port 11 also located at the front panel enable local connection of smart-card reader 42 and smart-card 40 or biometric card reader to support user authentication and enhance system security. Optional freeze push-button 8 enables user selection of normal or freeze mode. In freeze mode, smart-card reader 42 is locked to same host when user is free to select other KVM channels for interaction with hosts.

In some installations (like the one shown here in FIG. 1) it may be desirable to locate the user at remote location not in the close vicinity to the attached hosts. This remote access may be required due to one or more of the following reasons:
1. To reduce the size/volume needed for equipment at user's location
2. To avoid excessive noise from hosts at user's location
3. To avoid excessive heat from hosts at user's location
4. To reduce the amount of wiring at user's location
5. To position the hosts and KVMs in a secure zone or room outside of users reach In this typical prior-art system the KVM 2 console ports 111 are attached to the KVM extender transmitter 20 through display video out cable 12, USB interconnect cable 15 and optional audio interconnect cables 18. KVM Extender transmitter 20 and receiver 26 may use Ethernet cable or one or more fiber optical cables such as communication channel (media) 24 to extend the KVM console port lines to a distance from few meters to few hundred meters as needed for particular installation. The KVM Extender transmitter 20 converts the video, USB transmit and audio out to serial protocol compatible with media 24. The KVM Extender receiver 26 converts back the serial protocol on attached media 24 back to standard video, USB and audio signals. Remote user desktop 30 comprising of display 32, keyboard 34, mouse 36 and headset 37 coupled to the KVM Extender receiver 26. Microphone audio analog signal from headset 37 and USB traffic to the host from keyboard 34 and mouse 36 are being converted in the KVM Extender receiver 26 to serial signal. Serial signal is routed over the media 24 to the KVM Extender transmitter 20 where it is converted back to standard USB and audio signals coupled to the KVM 2 console ports.

System may also support User display 32 EDID (Extended Display Identification Data) protocol to enable display Plug & Play (not shown in this figure).

KVM Extender transmitter 20 and receiver 26 are typically powered by AC to DC power supplies 21 and 28 respectively. KVM 2 is similarly powered.

In this system 1 the remote user may switch KVM channels using special keyboard key combinations. No KVM indications available to the remote user and no remote access to the smart-card reader 42.

When KVM 2 is a secure KVM and the system 1 is used to enable access to isolated hosts 3a to 3d, there are several disadvantages in this setup:
1. User is not provided with remote KVM indications.
2. User is not provided with remote smart-card reader connection or indication and control. In this prior-art system these functions can be performed only at the KVM 2 front panel.
3. Secure KVM typically does not offer keyboard key combination control due to security reasons. If that is the case then only KVM front panel push buttons 9a to 9b can control KVM channel selection. User thus cannot control KVM channels remotely.
4. The KVM and the KVM Extender function are not integrated together. There are 2 external boxes to connect. This system is therefore more vulnerable to security threats especially if Secure KVM 2 is fitted with active anti-tampering function and KVM Extender 20 and 26 are not part of that system.
5. The KVM Extender 20 and 26 are typically expensive components.

FIG. 2 illustrates a high-level block diagram presenting another example of a prior-art multiple hosts and KVM system 100 similar to the system 1 of FIG. 1 above.

In this system 1 KVM control and indications available to remote user through remote Controller-Indicator 40 coupled to KVM 2 through cable 38. User may select one of hosts 3a to 3d using a selector switch or dial 112 on remote Controller-Indicator 40. The selection (e.g. host number "4" in this example) is then displayed on a rudimentary display 113 on remote Controller-Indicator 40. Serial communication protocol such as RS-232, RS-485 or $I^2C$ is used to communicate between the KVM and the remote controller/indicator.

While this system improves remote channel selection and remote channel indication, it still suffers from similar disadvantages of system 1 in FIG. 1 above.

One key disadvantage of this system is the degradation of system security. This prior-art system is highly vulnerable to intrusions and "Man in the middle" attacks:
1. Remote Controller-Indicator 40 is not authenticated in front of the KVM 2. Thus, KVM 2 cannot trust remote Controller-Indicator 40. It is possible that a tampered hardware or an intruder will control the KVM 2 instead of the authorized user.
2. Remote Controller-Indicator 40 communications with the KVM 2 is not encrypted. Attackers may easily generate false commends to coupled KVM 2.
3. Remote Controller-Indicator 40 do not support smart-card extension, control and indication needed to authenticate remote user in front of attached hosts.
4. Remote Controller-Indicator 40 do not support active anti-tampering and tampering-evident means.

Due to these and other reasons, this prior-art implementation is not preferred for usage in high security applications with secure KVMs. Certified prior-art secure KVM does not support remote Controller-Indicator connection 31.

FIG. 3 illustrates a high-level block diagram of an example of multiple hosts and a secure KVM system 200 according to an exemplary embodiment of the present invention.

While this system is similar in its functionality to the systems in FIGS. 1 and 2 above, this implementation is more trusted in terms of system security.

Secure KVM 202 is coupled to 4 isolated host computers 3a to 3d through four KVM host cables 4a, 4b, 4c and 4d respectively. Each one of the KVM host cables 4a to 4d typically comprises of bundled USB, video and audio lines.

KVM 202 front panel push-buttons 9a to 9d enable user local selection of hosts 3a to 3d respectively. Secure KVM console ports are coupled to the user desktop area 30 through cables 12, 15, 18, 19 and 55. Cables length is typically limited to few meters to maintain signal strength and quality.

User keyboard 34 is coupled to secure KVM 202 console USB port through USB cable 15. User display 32 is coupled to secure KVM 202 console display port through video cable 12. User headset 37 is coupled to secure KVM 202 console audio port through host audio cable 18. User Mouse 36 is coupled to secure KVM 202 console USB port through USB cable 19.

Secure KVM 202 is having a Secure KVM Remote Controller-Indicator port 29 connected internally to KVM remote interface microcontroller 35 that drives the secure controller indicator 50 through cable 55. Inside the secure controller indicator 50 the cable 55 is coupled with interface microcontroller 53 that drives remote user display 54 and remote user keys 52. Remote user display 54 may be constructed from simple discrete LEDs, Seven-segments LED, small LCD, graphic LCD (dot matrix), Custom LCD, TFT, OLED or any other suitable display technology. Information presented to the remote user on the remote user display 54 may include one or more of the following:
1. Channel number selected
2. Status of communication link with the coupled secure KVM
3. Channel selected name (text string)
4. Smart-card status
5. Smart card freeze channel
6. Tamper event indication
7. KVM self test status Remote user keys 52 may be used by remote user to perform one or more of the following functions:
1. Select coupled KVM channel
2. Toggle channels up and down Remote interface microcontroller 35 in the secure KVM 202 is running encryption function such as: SHA-0, SHA-1, SHA-2, SHA-3, SHA-256, SHA-512, SHA-224, SHA-384, DES, Triple DES, AES 128, AES 192, AES 256, MD4 and MD5 to authenticate coupled Secure KVM Remote Controller-Indicator 50 interface microcontroller 53 and to enable message encryption between the two controllers on exposed cable 55. A pairing process loads same secret key on both remote interface microcontrollers 35 and 53 to enable mutual authentication and message encryption. One interface microcontroller or two may have Random Number Generator (RNG) to enable random challenge-response type mutual authentication as will be shown bellow in next figures.

Remote interface microcontroller 35 in the secure KVM 202 is coupled to other secure KVM circuitry through one or more lines 60 to control and monitor internal functions such as channel selection and status. Internal circuitry or firmware in secure KVM 202 may disable front panel switches 9a to 9d and 8 to prevent simultaneous/ambiguous control from both remote and local resources. For example, secured KVM 202 may be placed at hand reach from the user. In this case, Secure KVM Remote Controller-Indicator 50 is not installed and the user selects hosts by directly manipulating front panel switches 9a to 9d and 8. In some embodiments, remote interface microcontroller 35 detects connection with Secure KVM Remote Controller-Indicator 50 and disables switches 9a to 9d and 8 automatically.

This embodiment of the present invention may support user display 32 EDID protocol to enable display Plug & Play (not shown in this figure). Bi-directional EDID data may be routed from user display 32 through video cable 12, secure KVM 302, host cables 4a to 4d and hosts 3a to 3d video cards. Secure KVM 302 may buffer or emulate display EDID data to prevent data leakages from EDID channel.

In this embodiment of the present invention, the traffic encryption and mutual authentication used reduces system vulnerabilities to Secure KVM Remote Controller-Indicator attacks.

FIG. 4 illustrates a high-level block diagram of yet another example of multiple hosts and a secure KVM system 300 of the present invention having remote accessed smart-card reader.

Secured KVM 302 may be placed at hand reach from the user. In this case, Secure KVM Remote Controller-Indicator 88 is not installed and the user selects hosts by directly manipulating front panel switches 9a to 9d and 8.

In accordance with the current exemplary embodiment of the present invention Secure KVM 302 further comprises a smart-card reader selector switch 82 to enable USB lines switching between local port 11 and remote smart-card reader port 89 located at the Secure KVM Remote Controller-Indicator 88.

When Secure KVM Remote Controller-Indicator 88 is connected to secure KVM 302, preferably prior to KVM power on, and once Secure KVM Remote Controller-Indicator is successfully authenticated, the remote interface microcontroller 80 triggers the following changes in the Secure KVM 302:
1. Local channel selection push-buttons 9a to 9d are disabled. Channel selection commands are received from Secure KVM Remote Controller-Indicator 88, decrypted by remote interface microcontroller 80, and sent to secure KVM 302 channel selection function through lines 60.
2. Local smart-card port freeze push-button 8 is disabled. Freeze and unfreeze commands are received from Secure KVM Remote Controller-Indicator 88, decrypted by remote interface microcontroller 80, and sent to secure KVM 302 smart-card function through lines 60.
3. Remote interface microcontroller 80 switches smart-card reader selector switch 82 to remote port 89. Smart-card reader 42 with smart-card 40 attached to remote smart-card port 89, coupled through USB cable 22, Secure KVM Remote Controller-Indicator port 33, smart-card reader selector switch 82, and through lines 85 to Secure KVM smart-card function.

To further extend the distance between the Secure KVM 302 and the user desktop area 30, optional HDMI/DVI Equalizer 39 may be installed near the user display 32. The HDMI/DVI Equalizer 39 automatically provide compensation for DVI and HDMI v1.3 cables 12 of up to 35 meters long.

Secure KVM Remote Controller-Indicator port 33 may be implemented using a removable connector to enable system modularity, maintenance, installation and upgradeability.

This implementation of the current invention enable remote user to authenticate in front of hosts 3a to 3d using smart card reader 42 and smart-card 40 without gaining access to the secure KVM 302. Remote user may also use remote user display 54 and remote user keys 52 to monitor and control smart-card reader functions such as freeze and unfreeze.

FIG. 5 illustrates a high-level block diagram of yet another example of multiple hosts and a secure KVM system 400 of the present invention having remote graphic LCD.

In this figure and in the next figures, the isolated hosts and some Secure KVM functions were removed from the figure to provide clearer figures.

In this figure, Secure KVM Remote Controller-Indicator 402 is illustrated in greater details.

In this embodiment of the present invention, Secure KVM Remote Controller-Indicator 402 is driving a dot matrix graphic LCD 99 via line 731 to display channel selection and other relevant data to the remote user. Graphic LCD 99 may show selectable channel numbers and pre-programmed channel names to improve user security and situational awareness.

A colored LCD 99 may be used to provide color indications of networks in use as many secured organizations are using color codes to designate networks or security levels. Alternatively a multicolor LCD LED backlight may be used to emit specific predefined colors for each selected channel.

Interface microcontroller 404 drives the graphic LCD 99 and control the LCD backlight intensity (brightness) based on:
1. Fixed pre-defined value.
2. Ambient light sensor 90 input converted by Analog to Digital converter 92. In this implementation graphic LCD 99 brightness may be automatically adjusted to the ambient lighting conditions sensed by sensor 90.
3. User defined setting using a graphical interface such as a slider control and rotary encoder 98.

Secure KVM Remote Controller-Indicator 402 also comprising of user input means 98 such as rotary encoder, push buttons, touch panel, selector switch etc. In one proffered embodiment of the present invention a rotary encoder 98 with push switch is placed at the secure KVM controller 402 front panel near the graphic LCD 99. In this preferred embodiment the user may rotate the rotary encoder 98 until the graphic LCD 99 presenting the proper network name or channel number. Then the user pushes the rotary encoder 98 to select that particular channel.

In some embodiments, the user may rotate the rotary encoder 98 until the graphic LCD 99 presents a "LCD backlight intensity selection" notice. Then the user pushes the rotary encoder 98 to enter the LCD backlight intensity selection mode. The user rotates the rotary encoder 98 to determine the desired LCD backlight intensity and then pushes the rotary encoder 98 to set the desired LCD backlight intensity and exit the LCD backlight intensity selection mode.

Secure KVM Remote Controller-Indicator 402 interface microcontroller 404 securely communicates with coupled Secure KVM 406 Remote Interface microcontroller 78 through serial data out line 76 and serial data in line 74. Communications protocol used may be any suitable serial protocol such as: RS-232, RS-422, RS-485, USB, I²C, SMBUS, CAN Bus, Ethernet over copper, Ethernet over fiber etc. Communication media can be substituted by other means such as one or more fibers, RF wireless, Infra-red etc.

Information transferred between the two remote interface microcontrollers 404 and 78 is encrypted as in system 300 of FIG. 4 above. Additional security controllers 407 and 96 are optional to assist remote interface controllers 404 and 78 respectively with secure authentication, keys handling and encryption functions as required. It should be noted that some secure microcontrollers available in the market today are having these additional security function built a single chip with additional protected memory and anti-tempering functions. If such microcontrollers are used, items 407 and 96 are not required.

In this embodiment of the present invention, power to the Secure KVM Remote Controller-Indicator is supplied from the coupled Secure KVM 406 internal supplies through power cable 75. DC to DC circuitry (not shown here) can be placed inside Secure KVM Remote Controller-Indicator to convert a single voltage from coupled secure KVM into other higher or lower supply voltage as needed.

Cable connecting the Secure KVM Remote Controller Indicator 402 and coupled Secure KVM 406 may be constructed from one multi-conductors shielded cable having a single connector 77 at the Secure KVM 406 side or another connector 71 at the remote side.

Remote interface controllers 404 and 78 may have also a battery powered Real Time Clock and special memory functions to provide an auditable log of security related events with time stamps.

Anti-tampering sensor 93 may be coupled to the Secure KVM Remote Controller-Indicator 402 enclosure for example through screw 97 in such way that will trigger the sensor 93 whenever an unauthorized removal of screw or opening of the enclosure is detected. Sensor 93 is typically a small micro-switch that is mechanically coupled to one or more critical enclosure screw 97. Additional types of anti-tampering sensors may be used to detect mechanical shocks, thermal shocks, visible light, X-Ray, shield integrity or any other critical security related parameter known in the art. Anti-tampering sensor 93 is coupled to optional anti-tampering controller 94. This low-power controller 94 may be powered by battery 95 when system is un-powered to enable anti-tampering function when Secure KVM Remote Controller-Indicator is in transit, storage or un-powered by Secure KVM. When tampering event is detected by sensor 93, anti-tampering controller 94 performs an irreversible function such as erase of a secrete key. Once the secret key is erased, the coupled Interface microcontroller 404 drives one, some or all the following TAMPERED mode events upon power on:
1. Graphic LCD 99 present a visible "DEVICE TAMPERED" message to the user.
2. All user defined text (such as network names) is permanently erased.
3. If coupled to an authenticated Secure KVM 406, tampering status is sent to KVM.
4. All Secure KVM Remote Controller-Indicator functions are disabled, device will lock.
5. All coupled hosts are isolated from local or remote user console.

A tampered Secure KVM Remote Controller-Indicator 402 may preferably be fixed only by the product manufacturer to prevent security attacks that tamper the product and fix it in the field. Optionally, tampered Secure KVM Remote Controller-Indicator 402 may not be fixed and needs replacement. Passive tampering-evident means such as one or more holographic labels may be use to augment the active anti-tampering system described above. Passive anti-tampering means typically provides irreversible indication that the product physical envelope was opened or tampered.

FIG. 6 illustrates a high-level block diagram of yet another example of multiple hosts and a Secure KVM system 500 of the present invention having remote graphic LCD 99 driven by an isolated display microcontroller 120. In this figure Secure KVM Remote Controller-Indicator 502 is illustrated in greater details.

In this exemplary embodiment of the present invention, Secure KVM Remote Controller-Indicator 502 is having an isolated display microcontroller 120 that drives the remote graphic LCD 99. This arrangement enables full isolation between display microcontroller 120 and the remote interface microcontroller 504 that linked to the Secure KVM 406 remote interface microcontroller 78. Display microcontroller 120 may be programmed by a suitable external programmer through field programming port 122. The information that can be programmed in the display microcontroller 120 non-volatile memory may include network name text strings. As this information may be sensitive due to security reasons, a preferred embodiment of the present invention may use two unidirectional data diodes (such as opto-couplers) to assure that only the following information flows will exist:

Remote interface microcontroller 504 sends selected channel information into the display microcontroller 120 through unidirectional data diode 126.

Anti-tampering controller 94 sends tampering event flag into the display microcontroller 120 through unidirectional data diode 124. This flag is used to trigger "DEVICE TAMPERED" message to user and to delete all programmed text in case of a tampering event.

This arrangement assures that even if coupled Secure KVM 406 remote interface microcontroller 504 firmware was tampered, the classified text stored in display controller 120 will not be accessible.

In this preferred embodiment of the present invention, remote graphic LCD 99 is having resistive touch-screen layer attached by lines 128 to analog to digital converter 92 to detect user touches on LCD surface. In this embodiment user may select a channel by directly touching the channel text line at LCD 99 surface instead of using the rotary encoder 98 for channel selection. Ambient light sensor 90, preferably located near LCD 99 is connected to ADC 92 which feeds remote interface microcontroller 504 via line 717.

FIG. 7*a* illustrates an example of the front panel of Secure KVM Remote Controller-Indicator 402/502 of FIGS. 5 and 6 according to the present invention. In this figure graphic LCD 99 preferably located in the center of the device facing the user. Rotary encoder 98 knob located to the right side of the LCD 99. Ambient light sensor 90 is preferably located near LCD 99.

FIG. 7*b* illustrates an example of the back panel of Secure KVM Remote Controller-Indicator 402/502 of FIGS. 5 and 6 according to the present invention. The back panel comprises of: remote console cable port 71, and optional programmer port 122 depicted in FIG. 6.

FIG. 8*a* illustrates an example of the front panel of Secure KVM 406 of FIGS. 3 to 6 above according to the present invention. The device front panel comprises of: local smart-card reader jack 11, smart-card freeze push-button 8, local smart-card reader jack port LED 180 to indicate port status, local channel selection push-buttons 9*a* to 9*d*, channel selection indicator LEDs 23*a* to 23*d* and tampering evident label 49.

FIG. 8*b* illustrates an example of the back panel of Secure KVM 406 of FIGS. 3 to 6 according to the present invention. The device back panel comprises of: local console keyboard jack 314*a*, local console mouse jack 314*b*, local console user display port 17, local console audio out jack 67*a*, local console microphone jack 67*b*, remote console port 77, host 1 to host 4 peripheral USB jacks 915*a* to 915*d* respectively, host 1 to host 4 smart-card USB jacks 960*a* to 960*d* respectively, host 1 to host 4 audio input jacks 27*a* to 27*d* respectively, host 1 to host 4 audio output jacks 25*a* to 25*d* respectively and DC input jack 738.

FIG. 9 illustrates a high-level block diagram of yet another example of multiple hosts and a Secure KVM system 600 of the present invention similar to system 500 of FIG. 6 above having remote extension of user console keyboard, mouse, headset and smart-card reader.

In this embodiment of the present invention remote user keyboard 34 is coupled to keyboard host emulator 607. Keyboard host emulator 607 enable connection of keyboard only and programmed to generate proprietary coded output for every user key-stroke. Keyboard host emulator 607 is unidirectional—it does not enable any reverse data flow from coupled mouse emulator 608.

Remote user mouse 36 is coupled to mouse host emulator 608. Mouse host emulator 608 enable connection of pointing device only and programmed to generate proprietary coded output for every user input. Mouse host emulator 608 is unidirectional—it does not enable any reverse data flow from coupled remote interface microcontroller 604. Mouse host emulator 608 receives keyboard codes data from keyboard host emulator 607 and combines it with mouse codes to generate a combined unidirectional stream routed to the remote interface controller 604. From remote interface controller 604, the keyboard and mouse codes are encrypted and passed on serial data out line 76 to the remote interface controller 79 in the Secure KVM 606, where it is decrypted and passed through the KVM peripheral data diode 625 and into the peripheral multiplexer and device emulators (not shown here). Peripheral data diode 625 assures that peripheral data may not flow backwards from coupled hosts to remote keyboard and mouse.

Remote user headset 37 (or any other audio peripheral such as microphone and speakers) is connected to the Secure KVM Remote Controller-Indicator 602 audio CODEC 605. Audio CODEC 605 may be standard AC-97, Intel High Definition Audio (HD Audio) or any other audio CODEC. Audio CODEC 605 converts headset microphone analog input into a digital serial stream that is routed via AC-Link or PS lines 57, through remote interface microcontroller 604, serial data out line 76 into the coupled Secure KVM 606 remote interface microcontroller 79. Remote interface microcontroller 79 separate the audio stream and pass it to the coupled audio CODEC 620 where analog signal is re-constructed and fed into the Secure KVM 606 console audio input through lines 622. In the reverse direction, Secure KVM 606 console mono or stereo audio output is passed through lines 622 to audio CODEC 620 where analog signal is converted into a digital serial stream. The digital serial stream is passed through the remote interface microcontroller 79, serial data in line 74 (part of connecting cable) to the Secure KVM Remote Controller-Indicator 602 remote interface microcontroller 604 where the digital serial stream is separated from other incoming traffic and passed through AC-Link or PS lines 57 to the coupled audio CODEC 605. Audio CODEC 605 converts back the digital serial stream into analog mono or stereo signal that is amplified and passed to the remote user headset 37.

It should be noted that in another exemplary embodiments of the present invention it is possible to design the system in such way that the audio digital streams bypass the remote interface controllers 604 and 79 by adding additional wires inside connecting cable 630. Standard AC link or I$^2$S or non-standard serial protocols may be used to pass audio digital streams without using serial data in 74 and out 76 lines.

Remote desktop area 30 may also have a remote smart-card or biometric reader device 42 with smart-card 40. Smart-card reader 42 is connected to Secure KVM Remote Controller-Indicator 602 through remote smart-card port 609, passed through connection cable 630 line 612 into the coupled Secure KVM 606 smart-card selector switch 85 similar to the smart-card implementation of FIG. 4 above. Smart-card selector switch 85 controlled by remote interface microcontroller 79 to switch smart-card lines 85 to the remote port whenever an authenticated Secure KVM Remote Controller-Indicator 602 is coupled.

Remote interface controller 79 may be designed to provide switching signals that will disable Secure KVM 606 console ports such as keyboard and mouse to prevent simultaneous access from local and remote devices (if required for security or functional reasons).

One advantage of this system 600 of the present invention is that it enables a secure extension of all user console functions (except for display that may be extended by other means).

FIG. 10 illustrates a high-level block diagram of yet another example of multiple hosts and a Secure KVM system 700 of the present invention similar to system 600 of FIG. 9 above having remote extension of user console display, keyboard, mouse, headset and smart-card reader.

In this embodiment of the present invention one or more optical fiber 720 is used to extend the complete user console to the user desktop area 30 using two optical Sub-Assemblies 722 (Transmit Optical Sub-Assembly or TOSA) and 710 (Receive Optical Sub-Assembly or ROSA). It should be noted that although TOSA is primarily a video transmitter, it is also function as a receiver for data side channel and therefore it is better defined as a transceiver. Similarly ROSA is also a transmitter and therefore defined here as a transceiver. Depending on the type of optical Sub-Assemblies 722 (TOSA) and 710 (ROSA) used, optical fiber 720 may be single mode type with typical maximum distance of 5,000-10,000 meters or multi-mode type with typical maximum distance of 100-200 meters. Optical fiber 720 is typically terminated by standard connector such as SC type to enable easy installation and maintenance. For example Omron TOSA-ROSA SX51 is capable of supporting 5 transmit lanes and 1 receive lane over single multimode fiber to a distance over 1,000 meters. The SX51 receive lane may be used to send back USB data, audio data streams, display EDID and other required data from the Secure KVM Remote Controller-Indicator 702 to the coupled Secure KVM 706. This additional low-speed channel is called serial side-channel (designated as 712 and 723 in this figure) and it is bidirectional.

Remote user headset 37 (or any other audio peripheral such as microphone and speakers) is connected to the Secure KVM Remote Controller-Indicator 702 audio CODEC 605. Audio CODEC 605 may be standard AC-97, Intel High Definition Audio (HD Audio) or any other audio CODEC. Audio CODEC 605 converts headset microphone analog input into a digital serial stream that is routed through AC-Link or PS lines 57, through remote interface microcontroller 704, data side-channel 712 of fiber optical Sub-Assembly (or ROSA) 710, through optical fiber 720 to the Secure KVM 706 fiber optical transceiver (or TOSA) 722. Fiber optical Sub-Assembly (or TOSA) 722 data side-channel 723 passes the digital serial stream through to the remote interface microcontroller 725 and to the Secure KVM 706 audio CODEC 620 where the digital data stream is converted back into analog signal connected through lines 622 to the Secure KVM 606 console audio input port.

In the reverse direction, Secure KVM 706 console mono or stereo audio output is passed through lines 622 to audio CODEC 620 where analog signal is converted into a digital serial stream. The digital serial stream is passed through the remote interface microcontroller 725 to the data side-channel 723 of fiber optical Sub-Assembly (or TOSA) 722, through optical fiber 720 to the Secure KVM Remote Controller-Indicator 702 fiber optical Sub-Assembly (or ROSA) 710. From fiber optical Sub-Assembly (or ROSA) 710 data side-channel 712 it passes to the remote interface microcontroller 704 where it is separated from other incoming traffic and send to the coupled through AC-Link or PS lines 57 to audio CODEC 605. Audio CODEC 605 converts back the digital serial stream into analog mono or stereo signal that is amplified and passed to the remote user headset 37.

Digital video signals at the Secure KVM 706 console display port, are attached through lines 729 to the fiber optical Sub-Assembly (or TOSA) 722, through optical fiber 720 to the Secure KVM Remote Controller-Indicator 702 fiber optical Sub-Assembly (or ROSA) 710 where digital video signal is reconstructed and passed through line 714 into the coupled remote display 32. In another preferred embodiment of the present invention additional sets of TOSA—ROSA many be added to support additional remote user displays as needed.

Remote display 32 EDID lines 81 are coupled to the Secure KVM Remote Controller-Indicator 702 remote interface microcontroller 704 where all input/output data is processed tagged and sent through the data side-channel 712 to the fiber optical Sub-Assembly (or ROSA) 710. EDID is then sent over the optical fiber 720 to the Secure KVM 706 fiber optical Sub-Assembly (or TOSA) 722. Fiber optical Sub-Assembly (or TOSA) 722 data side-channel 723 passes the EDID to the remote interface microcontroller 725 where display EDID I2C signals are reconstructed and bi-directionally coupled through interface lines 60 to the Secure KVM EDID read switch and controller function to enable remote display EDID reading. Secure KVM 702 EDID emulation circuitry replicates remote user display 32 EDID and writes it in 4 isolated EDID emulators accessible to the 4 coupled hosts. This EDID related process is critical to assure that coupled host video output settings will match remote display 32 capabilities.

Secure KVM Remote Controller-Indicator 702 anti-tampering controller 94 is coupled to the remote interface microcontroller 704 to trigger post tampering events. These post tampering events may include one, few or all of:

1. Graphic LCD 99 present a visible "DEVICE TAMPERED" message to user.
2. All user defined text (such as network names) is permanently erased.
3. If coupled to an authenticated Secure KVM 706, tampering status is sent to KVM 706 through the data side-channel 712, the fiber optical Sub-Assembly (or ROSA) 710. Tampering status is then sent over the optical fiber 720 to the Secure KVM 706 fiber optical Sub-Assembly (or TOSA) 722. Fiber optical Sub-Assembly (or TOSA) 722 data side-channel 723 passes the tampering status to the remote interface microcontroller 725 where it is converted into a tampering flag signal 69 connected to the Secure KVM 706 tampering detection circuitry. If a tampered Secure KVM Remote Controller-Indicator 702 is connected to a Secure KVM 706 or if Secure KVM Remote Controller-Indicator 702 is tampered while operating with Secure KVM 706, it may be required that the coupled Secure KVM 706 will become irreversibly tampered as well.

4. All Secure KVM Remote Controller-Indicator 702 functions are disabled, device will lock.

In this embodiment of the present invention remote user keyboard 34 is coupled to keyboard host emulator 607. Keyboard host emulator 607 enable connection of keyboard only and programmed to generate proprietary coded output for every user key-stroke. Keyboard host emulator 607 is unidirectional—it does not enable any reverse data flow from coupled mouse emulator 608.

Remote user mouse 36 is coupled to mouse host emulator 608. Mouse host emulator 608 enable connection of pointing device only and programmed to generate proprietary coded output for every user mouse input. Mouse host emulator 608 is unidirectional—it does not enable any reverse data flow from coupled remote interface microcontroller 704. Mouse host emulator 608 receives keyboard codes data from keyboard host emulator 607 and combines it with mouse codes to generate a combined unidirectional stream routed to the remote interface microcontroller 704. From remote interface microcontroller 704, the keyboard and mouse codes are encrypted and passed through the data side-channel 712, the fiber optical Sub-Assembly (or ROSA) 710. Encrypted keyboard and mouse codes are then sent over the optical fiber 720 to the Secure KVM 706 fiber optical Sub-Assembly (or TOSA) 722. Fiber optical Sub-Assembly (or TOSA) 722 data side-channel 723 passes the encrypted data to the remote interface microcontroller 725 where it is decrypted and passed through the KVM peripheral data diode 625 and into the peripheral multiplexer and device emulators (not shown here). Peripheral data diode 625 assures that peripheral data may not flow backwards from coupled hosts to remote keyboard and mouse.

Remote desktop area 30 may also have a remote smart-card or biometric reader device 42 with smart-card 40. Smart-card reader 42 is connected to Secure KVM Remote Controller-Indicator 702 through remote smart-card port 609 and coupled to remote interface microcontroller 704 where bi-directional smart-card traffic is being encrypted and passed the data side-channel 712, the fiber optical Sub-Assembly (or ROSA) 710. Encrypted smart-card USB traffic is then sent over the optical fiber 720 and to the Secure KVM 706 fiber optical Sub-Assembly (or TOSA) 722. Fiber optical Sub-Assembly (or TOSA) 722 data side-channel 723 passes the encrypted data to the remote interface microcontroller 725 where it is decrypted and reconstructed as standard USB signal. This standard USB lines are coupled through lines 83 to smart-card selector switch 82 to the smart-card qualification circuitry through lines 85. Secure KVM 706 smart-card selector switch 85 operates similar to the smart-card implementation of FIG. 4 above. Smart-card selector switch 85 controlled by remote interface microcontroller 725 to switch smart-card lines 85 to the remote port whenever an authenticated Secure KVM Remote Controller-Indicator 702 is properly coupled (authenticated and not tampered).

In this embodiment of the present invention it is not possible to power the Secure KVM Remote Controller-Indicator 702 from the Secure KVM 706 as the interconnecting media is fiber 720. The power source to the Secure KVM Remote Controller-Indicator 702 is therefore powered by an AC to DC brick or wall-mounted type power supply 28 through DC jack 730. Inside Secure KVM Remote Controller-Indicator 702 DC to DC power supply may be added to provide required voltages.

In this embodiment of the present invention Secure KVM 706 control and monitoring messages such as remote channel selection, remote freeze/unfreeze commands and other messages can be exchanged between the Secure KVM Remote Controller-Indicator 702 and the coupled Secure KVM 706 through the bi-directional data side-channel that is passed together with the unidirectional video traffic over the fiber media 720. For example, remote user channel selection triggered by user pressing rotary encoder 98, is processed by remote interface microcontroller 704 generating an encrypted channel selection message that is passed through data side-channel 712, the fiber optical Sub-Assembly (or ROSA) 710. Encrypted channel selection message is then sent over the optical fiber 720 and to the Secure KVM 706 fiber optical Sub-Assembly (or TOSA) 722. Fiber optical Sub-Assembly (or TOSA) 722 data side-channel 723 passes the encrypted data to the remote interface microcontroller 725 where it is decrypted and sent to the Secure KVM 706 channel selection circuitry through lines 60.

Ambient light sensor 90, preferably located near LCD 99 is connected to ADC 92 which feeds remote interface microcontroller 704 via line 717.

In this and other embodiments of the present invention graphic LCD 99 may be used to provide installation and support information such as:

Installation wizards and manual
Link status, communication errors
Authentication (pairing) error
Power indication
Self-test indication, device ready
Valid video signal available
User defined text entry such as network names Another optional function of the present invention that may be useful for users that operating audio equipment or audio communications, is the use of audible messages to announce selected channel. Audio CODEC 605 may be derived by the remote interface microcontroller 704 to generate audible messages announcing selected channel name in user speaker or headsets 37. Additionally or alternatively secured KVM Controller-Indicator 602 may comprise a speaker (not shown) for generate audible messages announcing selected channel name and/or providing tempering alarm, etc.

User or administrator having proper permissions level may program the Secure KVM Remote Controller-Indicator 702 with custom user defined text or colors through various methods such as:

1. Using rotary encoder 98 to type individual characters,
2. Using standard, non-standard or secure mass-storage device coupled to smart-card port 609 or to USB keyboard or mouse port to read special format text file,
3. Using USB keyboard coupled to USB keyboard port to type text,
4. Using special smart-card 40 inserted into smart-card reader 42 to save secure files from card,
5. Using EDID emulator with loadable text file attached to user display port,
6. Using special (dedicated programmer) coupled to a dedicated programmer port (not shown in this figure),
7. Using a cable to attach the Secure KVM Remote Controller-Indicator 702 directly to a host PC to program text file.

As custom user define text may be critical for system security, device and user authentication methods may be used to ensure that text entry initiated by authorized device and user.

Independently from method used to load custom user text or colors, the information is stored in remote interface microcontroller 704 internal non-volatile memory or in security controller 407 protected memory. This user data may be deleted automatically if anti-tampering system is being activated to prevent unauthorized disclosure of entered data.

To prevent ambiguous control of the Secure KVM 706, when optional Secure KVM Remote Controller-Indicator 702 is connected all local controls are disabled. Optionally local Secure KVM 706 console ports are also disabled FIG. 11 illustrates a high-level block diagram of Secure KVM 706 of FIG. 10 above in greater details. In this figure, the interaction between the remote desktop Controller-Indicator interface and the other related circuitry is clearly shown.

In this figure Secure KVM 706 is having fiber optical Sub-Assembly (or TOSA) 722 to communicate via optical fiber 720 with remote desktop controller/indicator. Fiber optical Sub-Assembly (or TOSA) 722 is receiving digital video signals over multiple TDMS lines 792 coupled to the video multiplexer 921. Video multiplexer 921 is typically a digital video switch supporting 4 differential channels (TDMS) and 4 different inputs based on channel selection command lines 923 that controlled by the main controller function 920. When Secure KVM Remote Controller-Indicator 702 is coupled to the Secure KVM 706 and properly authenticated, channel selection command lines 923 are remote controlled through main controller function 920 lines 60 and remote interface microcontroller 725. Remote interface microcontroller 725 decrypts remote controller channel selection commands from the Secure KVM Remote Controller-Indicator 702 as shown in previous figures. When Secure KVM Remote Controller-Indicator 702 is coupled to the Secure KVM 706 and properly authenticated, remote interface microcontroller 725 also may signal main controller function 920 through lines 60 to disable front panel channel selection push-buttons 9a to 9d to prevent multiple sources for channel selection.

The 4 inputs of the video multiplexer 921 are coupled to the coupled hosts 3a to 3d through video input ports 912a to 912d and host video cables 7a to 7d respectively.

Additional video switch not shown here may be added on video lines 927 to enable local video port 17 disable when Secure KVM Remote Controller-Indicator 702 is installed.

Fiber optical Sub-Assembly (or TOSA) 722 also receiving/transmitting remote display EDID information through data side-channel 723. EDID information is decrypted by remote interface microcontroller 725 and coupled to EDID read switch 924 through lines 726. When read switch 924 is closed by main controller function 920, it can read EDID information from remote display and store it locally until ready to write it. When main controller function 920 is ready to write EDID, it opens the read switch 924 and with the same KVM mode select line 922 switches through mode switches 916a to 916d the Emulated EDID memory chips 910a to 910d respectively to write mode. In write mode the selector switch 933 enables sequential writing cycles of EDID information by the main controller function 920. KVM mode select line 922 also disable all Emulated EDID memory chips write protect lines through switches 918a to 918d. Once the main controller function 920 completed writing EDID information on all Emulated EDID memory chips 910a to 910d it switches the memory chips to their host ports 912a to 912d to enable hosts reading same EDID information through video cables 4a to 4d respectively.

Fiber optical Sub-Assembly (or TOSA) 722 also optionally receiving/transmitting remote audio digital streams through data side-channel 723. Alternative method of transmitting stereo audio to the Secure KVM Remote Controller-Indicator 702 coupled headset 37 is by using audio path of the HDMI protocol from hosts to the remote display 32 having HDMI input and audio output. To avoid compatibility issues with legacy equipment not supporting HDMI audio the following audio path is implemented in the preferred embodiment of the present invention.

Audio input (from remote microphone) digital stream is received by the fiber optical Sub-Assembly (or TOSA) 722, passed through the data side-channel 723 to the remote interface microcontroller 725 where it is separated from other remote traffic, decrypted if necessary and reconstructed back as PS or AC-Link to drive the coupled audio CODEC 620.

Audio CODEC 620 converts the digital audio stream into an analog signal by using one or more Digital to Analog converters. Resulted analog audio signal is then routed to the Secure KVM microphone input and to the console microphone input jack 67b. Audio signal is then passed to the audio multiplexer block 68 where it is switched based on the channel selection lines 923 to one of the isolated hosts 3a to 3d through host audio cables (not shown here to reduce figure complexity). Mono or stereo audio output from the four hosts 3a to 3d is coupled through host audio cables (not shown here) to the audio multiplexer block 68 where one output is selected (switched) based on the channel selection lines 923. Selected channel audio signal is the passed to the console audio out jack 67a and to the audio CODEC 620 where it is converted into a digital stream by one or more Analog to Digital Converters (ADC). The resulted digital stream is passed through I$^2$S or AC-Link to the remote interface microcontroller 725 where it is encrypted (if needed) and combined with other outgoing traffic to the Remote Controller/Indicator. Outgoing traffic is passed through the data side-channel 723, the fiber optical Sub-Assembly (or TOSA) 722 and the optical fiber 720. It should be noted that low latency audio stream encryption/decryption may overload the remote interface microcontroller 725 or the security controller 96 and therefore audio it may be more feasible to stream the unencrypted audio stream to/from the Secure KVM Remote Controller/Indicator.

To prevent simultaneous connection of two audio sources it is possible to add mechanical switches in the console audio jacks 67a and 67b or analog switches controlled by the remote interface microcontroller 725.

To prevent ambiguous control of the Secure KVM 706, when optional Secure KVM Remote Controller-Indicator 702 is connected all local controls (8, 9a to 9d) are disabled. Optionally local console ports (video output 17, mouse and keyboard ports 314, smart-card reader port 11 and audio input and output ports 67) are also disabled.

Secure KVM 706 is having an active anti-tampering system comprising of one or more anti-tampering sensors 945 mechanically coupled to the product enclosure feature such as screw 946. When screw 946 is removed in unauthorized effort to remove enclosure cover, anti-tampering sensors 945 opens or close a circuit that irreversibly causing anti-tampering microcontroller 942 to delete a critical secret key. Anti-tampering microcontroller 942 may be powered by Secure KVM 706 power supply AC to DC 770 and DC jack 738 when Secure KVM 706 is powered, or by battery/super capacitor 940 when Secure KVM 706 is un-powered, in transit or in storage.

Once the anti-tampering microcontroller 942 has deleted its secret key, main microcontroller function 920 permanently changes the Secure KVM functionality to TAMPERED mode. In TAMPERED mode the following events will occur immediately if Secure KVM 706 is powered or once it is re-powered after a tampering event:
1. All Secure KVM 706 front panel LEDs are blinking.
2. All coupled hosts are isolated.
3. Front panel channel selection 9*a* to 9*d* are disabled.
4. Anti-tampering microcontroller 942 delivers a TAMPERING flag through lines 60 to remote interface microcontroller 725 that send the flag through the data side-channel 723, through the fiber optical Sub-Assembly (or TOSA) 722, the optical fiber 720 into the Secure KVM Remote Controller-Indicator 702 to disable the device and display TAMPERED message in remote LCD 99 (see FIG. 8 above). In additional all peripheral and display ports are disabled (no video, no keyboard, no mouse, no audio etc.).

If the Secure KVM Remote Controller-Indicator 702 is tampered it is desirable that the coupled Secure KVM will also become tampered to prevent and attempt to use it against trusted Secure KVMs. Once the Secure KVM Remote Controller-Indicator 702 is tampered, connected to a Secure KVM 706 and powered on, a TAMPERED flag is sent over the optical fiber 720. TAMPERED flag is received by the fiber optical Sub-Assembly (or TOSA) 722, passed through the data side-channel 723 into the remote interface microcontroller 725. The remote interface microcontroller 725 sends the flag to the coupled main controller function 920 through lines 60. The main controller function 920 will then enter a temporary or permanent TAMPERED mode (depending on pre-programmed security policy). Once in TAMPERED mode, the Secure KVM 706 will behave similar to local anti-tampering event as described above.

Encrypted keyboard and mouse codes are received from the Secure KVM Remote Controller-Indicator 602 through the optical fiber 720. Fiber optical Sub-Assembly (or TOSA) 722 passes the encrypted keyboard and mouse codes through the data side-channel 723 into the remote interface microcontroller 725 where data is being decrypted. The keyboard and mouse decrypted proprietary unidirectional code is then passed through the data diode 625 and through the peripheral multiplexer 913 that switches the traffic into one selected host channel. Peripheral multiplexer 913 is controlled by the main controller function 920 through channel select lines 923. In each one of the 4 host channels there is a peripheral data diode 908*a* to 908*d* that is coupled into the 4 isolated peripheral device emulators 930*a* to 930*d* respectively. Peripheral data diodes 908*a* to 908*b* assures that hosts would not leak through the Secure KVM 706 even if peripheral emulators 930*a* to 930*d* or main controller function 920 were tampered in firmware. It also assures that data will not flow backwards from hosts to the coupled local or remote peripheral devices. The device emulators 930*a* to 930*d* receives keyboard and mouse proprietary unidirectional code and provides USB keyboard and mouse emulation to the coupled hosts 3*a* to 3*d* through the 4 host peripheral ports 915*a* to 915*d* and host peripheral cables 904*a* to 904*d* respectively.

Smart-card encrypted bidirectional traffic is passed through the optical fiber 720. Fiber optical Sub-Assembly (or TOSA) 722 passes the encrypted smart-card traffic through the data side-channel 723 into the remote interface microcontroller 725 where data is being decrypted, separated from other traffic and reconstructed as standard USB protocol. USB signals are passed through lines 83 to smart-card selector switch 82 that controlled by remote interface controller 725. When an authenticated Secure KVM Remote Controller-Indicator 702 is coupled to the Secure KVM 706, the remote interface controller 725 switches the smart-card selector switch from local console port 11 to the remote port (left position), coupling the USB signal to the smart-card pre-qualification switch 950. The smart-card pre-qualification switch 950 is controlled by the pre-qualification microcontroller 952. When smart card reader is connected for the first time (locally or remotely), or when system is powered up, the smart-card USB lines are initially coupled to the pre-qualification microcontroller 952 through smart-card pre-qualification switch 950. The pre-qualification microcontroller 952 emulating a host and enumerate the attached reader to pre-qualify it based on pre-defined security profile. If card-reader matches the pre-qualification profile, the pre-qualification microcontroller 952 switches the pre-qualification switch 950 downstream (right position) coupling the USB signals to the smart-card channel select switch 956. The channel select switch 956 is controlled by the pre-qualification microcontroller 952 in two modes:
1. If system is not in smart-card freeze—smart card channel selection is equal to Secure KVM 706 channel selection lines 923.
2. If system is in smart-card freeze mode then smart-card channel selection lines are fixed at the last selected channel before freeze mode entered.

Freeze mode may be triggered locally by freeze push-button 8 connected to the pre-qualification microcontroller 952 or by remote user through message delivered over optical fiber 720, through the fiber optical Sub-Assembly (or TOSA) 722, the data side-channel 723 and the remote interface microcontroller 725 where freeze-unfreeze message is being decrypted, separated from other traffic and sent through line 944 to the pre-qualification microcontroller 952.

If after initial pre-qualification the smart-card reader is being disconnected or reset, the smart-card monitor function 954 will sense that event and signal the pre-qualification microcontroller 952 back to pre-qualification mode.

In case that the connected USB device (locally or remotely) did not match the predefined profile or in case that the smart-card monitor function 954 flags for unexpected pre-qualification a smart-card error indication will appear on the Secure KVM 706 front panel smart-card status indicator 18. Same status is sent through the optical fiber 720 to the Secure KVM Remote Controller-Indicator 702 and displayed to remote user on graphic LCD 99 or dedicated smart-card status LED.

The smart-card channel select switch 956 couples the USB signal to the selected host 3*a* to 3*d* through dedicated smart-card host ports 960*a* to 960*d* respectively (host cables not shown here).

FIG. 12 illustrates more detailed block diagram of the fiber optics remote interface sub-system of Secure KVM 706 illustrated in FIG. 11 above. This example of the current invention uses industry standard HDMI optical modules such as Omron SX51M (P1TX6A-SX51X-01M and P1RX6A-SX51X-01M). Other standard or custom optical modules can be used with internal video encryption or without video encryption. The optical module selected for the embodiment of the present invention preferably features:
1. Long range as needed for particular application
2. High quality video transmission
3. Very low latency
4. Minimum number of fibers (preferably single fiber)
5. Integrated bi-directional data side-channel In this embodiment KVM Console video output 927 is routed to the fiber optical Sub-Assembly (or TOSA) 722 through 4 TDMS lines based on DVI/HDMI standard. The TDMS lines TDMS 2 729a, TDMS 1 729b, TDMS 0 729c and CLK 729d may pass high-definition video and high quality audio to the High Speed TDMS Interface 924 that converts the differential TDMS signals into 4 differential CML data lines and one differential clock line coupled to the High Speed Laser Driver 733. The High Speed Laser Driver 733 provides adjustable laser bias and modulation currents to the coupled VCSELs 735a to 735e. It also includes an adjustable pulse-width control circuit to minimize laser pulse-width distortion.

VCSEL (Vertical Cavity Surface Emitting Laser) 735a to 735e are semiconductor micro-laser diodes that emits light in a cylindrical beam vertically from the surface of a fabricated wafer, and offers significant advantages when compared to the edge-emitting lasers currently used in the majority of fiber optic communications devices.

High-speed VCSEL 735a to 735d are capable of transmitting data throughput of up to 3.5 Gb/s per channel.

VCSEL 735a is modulated by TDMS 2 729a.
VCSEL 735b is modulated by TDMS 1 729b.
VCSEL 735c is modulated by TDMS 0 729c.
VCSEL 735d is modulated by CLK 729d.
VCSEL 735e is low-speed laser modulated by data side channel TX line 723a.

High-speed VCSEL 735a to 735d are monitored and by Laser Driver Control 926.

All optical components, VCSEL 735, PIN and High Speed Laser Drivers are integrated into one module called TX Optical Sub Assembly (OSA) 721 assembled on a printed circuit board. Optical fiber 720 is coupled to the TX OSA 721 using a standard fiber connector 728 such as LC or SC.

Electrical signal Mux/Demux 922 interface with standard EDID host on one side and to a single input and single output on the other side. This channel is used as the signal path for the low-speed data side-channel 723 for all DVI/HDCP/HDMI logic signals. Transmitted and received data lines are coupled to the Low-Speed Driver/Receiver Circuits 920 to interface with VCSEL 735e for all transmitted low-speed data and PIN 736 for all received low-speed data. PIN 736 serves as a low-speed optical receiver for data side-channel. A PIN diode is a diode with a wide, lightly doped 'near' intrinsic semiconductor region between a p-type semiconductor and an n-type semiconductor regions. The p-type and n-type regions are typically heavily doped because they are used for ohmic contacts.

Laser Multiplexer/De-multiplexer 737 is a CWDM (Coarse Wavelength Division Multiplexing) optical device that is coupled to the VCSEL 729a to 729e and PIN 736 on one side and to a single optical fiber 720 on the other side. The CDWM multiplexes multiple optical carrier signals on a single optical fiber by using different of laser light to carry different signals (also in different directions).

Remote Interface Microcontroller 725 is the module that handles and processes all non-video traffic to/from the Secure KVM Remote Controller-Indicator 702. This controller may be augmented by an external security processor 96 to handle remote side authentication and traffic encryption/decryption. Remote Interface Microcontroller 725 is coupled to the fiber optical Sub-Assembly (or TOSA) 722 through I²C lines SDA 723a and SCL 723b. All incoming and outgoing traffic is loaded on the PC protocol and encrypted/decrypted as necessary.

The Remote Interface Microcontroller 725 is coupled on the other side to the following Secure KVM 706 components:

1. Remote smart-card reader USB to smart-card selector switch 82 through USB lines 83,
2. Smart-card selector switch 82 local/remote through output line 84,
3. Messages to/from main controller function 960 through lines 60 (including channel selected, TAMPERED flag from remote side, TAMPERED flag from Secure KVM side etc.),
4. Keyboard and mouse traffic in proprietary unidirectional protocol to peripheral data-diode 625 through output line 61,
5. Smart-card status and control messages coupled to smart-card pre-qualification microcontroller 952 through lines 944 (including port status, freeze and unfreeze messages),
6. Audio input and output data streams coupled to audio CODEC 620 through AC-Link or I2S lines 799,
7. Remote display 32 EDID information to EDID input switch 924 through lines 726.

FIG. 13 illustrates more detailed block diagram of the fiber optics remote interface sub-system of the Secure KVM Remote Controller-Indicator 702 illustrated in FIG. 10 above.

Fiber optic 720 is coupled to the fiber optical Sub-Assembly (or ROSA) 710 through standard fiber connector (such as LC or SC) 728. Digital video stream based on HDMI or DVI standard received through fiber 720, separated to the different wavelengths in Laser Multiplexer/De-multiplexer 747 and received by the 4 PIN devices 745a to 745d.

PIN 745a receives TDMS 2 signal,
PIN 745b receives TDMS 1 signal,
PIN 745c receives TDMS 0 signal, and
PIN 745d receives CLK signal.

Signals received in PIN devices 745a to 745d are amplified by Quad TIA (Trans Impedance Amplifier)/LA 743. The Quad TIA LA 743 is used to amplify the non-linear current generated by the 4 PIN 745a to 745d and match it to the standard 50 Ohm lines coupled to the 4 High Speed TDMS Interface 969 that generated 4 TDMS signals 714a to 714d respectively. The 4 TDMS signals 714a to 714d are DVI/HDMI standard video signals and are coupled to the attached user display 32. It should be noted that with minor modifications similar embodiment of the present invention may be constructed to support other display protocols such as Display Port, legacy VGA or any future emerged standard. Similarly, optical fiber communications media may be replaced by Video over CAT 5 link, Ultra Wide Band wireless video encrypted link and any other suitable communication method capable of carrying high quality real-time video.

Optical Multiplexer/De-multiplexer 747 is also coupled to PIN 745e and VCSEL 746 that used to receive and transmit data side-channel signals respectively. PIN 745e and VCSEL 746 are coupled to the Low Speed Receiver/Driver Circuits 964 to translate signals into standard TTL level. Electrical signal Mux/Demux 965 reconstructs standard EDID/HDCP logic signals. Bi-directional PC signals SDA 712a and SCL 712b are the data side-channel signals and coupled to the Remote Interface Microcontroller 704 where all input/output data components are decrypted, separated and restructured to support the different Secure KVM Remote Controller-Indicator 702 functions.

The Remote Interface Microcontroller 704 is coupled on the other side to the following Secure KVM Remote Controller-Indicator 702 components:

1. Line 611 passes the unidirectional keyboard and mouse codes from the coupled mouse host emulator 608 (mouse host emulator 608 passes keyboard host emulator output as well).
2. Unidirectional lines 44 are coupled to the Anti-tampering controller 94 to enable transmission of tampering flag. It should be noted that in case of tampering of the coupled Secure KVM 706, a tampering flag (message) will be sent from Secure KVM 706 to the Remote Interface Microcontroller 704 and cause temporary or irreversible tampering remote indications and remote control disabling.
3. Lines 724 are USB smart-card lines that are coupled to the remote smart-card port 609,
4. Lines 717 are coupled to ADC 92,
5. Lines 81 are EDID lines that are coupled to the remote user display 32,
6. Lines 719 are coupled to the optional security controller 407,
7. Lines 57 are AC-Link or PS lines that are coupled to the audio CODEC 605,
8. Lines 731 are parallel or serial lines driving remote user LCD 99, and
9. Lines 727 are coupled to the rotary encoder 98.

FIG. 14a illustrates a simplified block diagram of the production pairing process of the Secure KVM 706 and the coupled Secure KVM Remote Controller-Indicator 702 of the present invention. This exemplary process may be used to pair the products when ordered together (as a set) in the production line or in the product supply chain.

Pairing is required in high-security environment to allow Secure KVM 706 to trust it assigned Secure KVM Remote Controller-Indicator 702 and to allow Secure KVM Remote Controller-Indicator 702 to trust its assigned Secure KVM 706. This mutual trust is needed to prevent "man in the middle" attack on the system or tampered Secure KVM 706 equipment to be connected and used.

In this process the Secure KVM 706 is first programmed during or immediately after production. At first step 652 authorized production employee read electronically or visually the Secure KVM unique Serial Number 650 and enter it into the production data-base. Serial Number reading can be done electronically by attaching a dedicated reader to the Secure KVM 706 or by reading bar-code or printed numbers on the product nameplate. The Secure KVM unique Serial Number 650 together with additional data such as security controller unique ROM ID, exact model, firmware revisions are stored in the production database 654. A predefined mathematical function is used to generate from all entered data a unique secret 656 that being loaded 655 into the Secure KVM 706 write-only secret memory.

Secure KVM 706 programming may be done after proper authentication through the remote console connector 77 shown in FIG. 8b or through the optical transceiver 722 of FIG. 11.

Secure KVM Remote Controller-Indicator 702 programming may be done after proper authentication through:
1. Dedicated programming port 122 of FIG. 7b,
2. Fiber optical transceiver 710 of FIG. 10,
3. Keyboard attached to keyboard port 619 of FIG. 10,
4. Proprietary USB device or standard mass storage device attached to smart-card reader port 609 of FIG. 10,
5. Smart-card 40 inserted into smart card reader 42 of FIG. 10, and
6. Manual programming using LCD 99 and rotary encoder 98 to input data.

After Secure KVM 706 is being programmed and database being updated, the paired Secure KVM Remote Controller-Indicator 702 is being programmed through the following steps: At first step 658 authorized production employee read electronically or visually the Secure KVM Remote Controller-Indicator 702 unique Serial Number 660 and enter it into the production data-base. Serial Number reading can be done electronically by attaching a dedicated reader to the Secure KVM Remote Controller-Indicator 702 or by reading bar-code or printed numbers on the product nameplate. The Secure KVM Remote Controller-Indicator 702 unique Serial Number 660 together with additional data such as security controller unique ROM ID, exact model, firmware revisions are stored in the production database 654. Then, the production database retrieves the paired Secure KVM 706 secret 656 and loads it into the Secure KVM Remote Controller-Indicator 702 write-only secret memory. Once both devices are loaded with same secret 656, the devices are paired.

FIG. 14b illustrates a simplified block diagram of the field pairing process of the Secure KVM 706 and the coupled Secure KVM Remote Controller-Indicator 702 of the present invention. This exemplary process may be used to pair the products at customer site and to enable proper maintenance and field support.

This process initiated by customer or supply chain representative log 662 into the manufacturer support web-site coupled to the same production database 654. Secure logon process 662 assures that logged on user is authorized to access pairing application. If Secure KVM 706 or Secure KVM Remote Controller-Indicator 702 are registered in the production database 654 as owned by the logged on customer then additional security check may be performed by the system prior to issue pairing code. It should be noted that once the Secure KVM 706 is in the field/customer site, it is assumed that secret key is already loaded on it and recorded in the production database 654. Secure KVM Remote Controller-Indicator 702 on the other hand may have previous loaded secret or may have no loaded secret if new Due to security and operational reasons it may be desirable to program a fixed (One Time Programmable) secret in the Secure KVM 706 side and user modifiable secret at the Secure KVM Remote Controller-Indicator 702 side.

After a successful logon 662 the user enters in the web form 664 the paired Secure KVM 706 Serial Number 660 in field 668. Then the user enters the required Secure KVM Remote Controller-Indicator 702 Serial Number 660 in field 670 of web form 664. Once entered, data is passed 666 to the production database 654. Once processed the system generates a pairing code 671 that appears in the web form 664. The user then connects the Secure KVM 706 and the soon to be paired Secure KVM Remote Controller-Indicator 702 and power it on. Once powered on the user may enter (see entry options at FIG. 14a above) the pairing code 672. In the Secure KVM Remote Controller-Indicator 702 the entered pairing code is converted into the secret 656 that stored in the device write-only secret memory. Once both devices are loaded with same secret 656, the devices are paired.

FIG. 15 illustrates a block diagram of the mutual authentication process that may be used by Secure KVM 706 of the present invention to authenticate coupled Secure KVM Remote Controller-Indicator 702.

When a Secure KVM 706 is powered on or recovers from a reset, and the Secure KVM Remote Controller-Indicator 702 is present (connected and ready for authentication), the Secure KVM 706 checks its tempered flag, and if it does not detect tampering it creates a very big number, called a challenge (850—step 1), entirely at random, and sends it (852—step 2) to the Secure KVM Remote Controller-Indicator 702 over the connecting cable or fiber preferably over the data side-channel.

The Secure KVM Remote Controller-Indicator 702 checks its tempered flag, and if it does not detect tampering it take this challenge and, together with an internally stored secret, performs a complex irreversible operation on it (such as HASH-1). See 858—step A.

Then, it returns the result of the operation to the Secure KVM 706 (860—step B). The Secure KVM 706, also knowing the same secret, performs the same special mathematical operation internally (853—step 3), and then compares the results (854—step 4). If the response from the Secure KVM Remote Controller-Indicator 702 matches the one computed in the Secure KVM 706 (step 5), then the Secure KVM Remote Controller-Indicator 702 has proven that it knows the secret, without revealing it. It proved to the Secure KVM 706 that it is the legitimate paired device. Eavesdropping on this conversation is of no use to an attacker who does not know the secret. This is because the challenge is different each time; it is randomly generated. The next challenge can never be predicted. The secret remains safely hidden inside the Secure KVM Remote Controller-Indicator 702, and the Secure KVM 706 knows that the Secure KVM Remote Controller-Indicator 702 is the authentic paired device (because only authentic paired device know the secret).

Once the Secure KVM Remote Controller-Indicator 702 was successfully authenticated, the Secure KVM 706 can trust Secure KVM Remote Controller-Indicator 702 and vise versa. After successful authentication by Secure KVM 706 of Secure KVM Remote Controller-Indicator 702 a reversed process may be performed to allow the Secure KVM Remote Controller-Indicator 702 to authenticate the coupled Secure KVM 706. After successful completion of both processes, the secure KVM 706 may start normal operation using encrypted messages (as shown in next FIG. 16) to and from the Secure KVM Remote Controller-Indicator 702 (856—step 6). In case that one or two of the authentications fail, the event is logged at the Errors and Logs function 846 and the Secure KVM 706 will stop operating indicating failure status.

Although during normal operation, message encryption may also serve as mutual authentication, it is possible that additional authentication cycles will be initiated to maintain the trust between the sides.

It should be noted that authentication method implemented may be augmented by other functions such as: unique ROM/device ID, Write cycle counter, authentication cycle counter, Tampering event flag etc.

FIG. 16 illustrates a block diagram of the data processing encryption and transmission from Secure KVM Remote Controller-Indicator 702 to coupled Secure KVM 706 of FIGS. 10 to 13 above. This figure shows both processes and physical blocks to better illustrate the internal data flows.

The Remote Interface Microcontroller 704 is coupled to the optional security controller 407 that assists the Remote Interface Microcontroller 704 in mathematical functions such as SHA 807. It is also may be critical to store one or more secret keys 805 in security controller 407 to prevent from security attacks on Remote Interface Microcontroller 704 to gain access to secret keys. Security controller 407 may also have an internal RNG.

Security controllers in general are better suited to protect secret keys and therefore may be better used for such secure application.

Inputs to the Remote Interface Microcontroller 704 are from resources such as:
1. anti-tampering controller 94 coupled through lines 44,
2. keyboard and mouse codes from the coupled mouse host emulator 608 coupled through lines 611,
3. EDID lines from remote user display 32 coupled through lines 81,
4. Channel selection information from the rotary encoder 98 coupled through lines 727,
5. Digital audio stream from the audio CODEC 605 coupled through AC-Link or PS lines 57,
6. Remote smart-card port 609 USB coupled through lines 724.

Information received from these inputs is structured by Message Builder function 816 to create predefined message packets (typically 160 bit long). These packets contain data received from above inputs with some header and error detection overheads. There may be different types of packets defined depending on current system activity and usage. Messages may be generated on a regular basis (in predefined time intervals) and/or at events. When message is ready to be sent it is passed processed by the message encryption path (XOR function 820) or may be passed through 819 directly to the message transmit function 826 without encryption. In order to encrypt a packet, the Remote Interface Microcontroller 704 initiates the following process (typically for each 160 bit of message data) to generate the pad and XOR it with the message:

1. The Remote Interface Microcontroller 704 generates a random number at RNG function (Random Number Generator) 810 and sends it to the SHA engine 807 of the security controller 407 through 719a. The link 719 between the Remote Interface Microcontroller 704 and the security controller 407 may be proprietary protocol or standard protocol such as I$^2$C or 1-Wire.
2. The Remote Interface Microcontroller 704 directs the security controller 407 SHA engine 807 to generate a SHA-1 digest using the random number and the secret 805.
3. The Remote Interface Microcontroller 704 reads the 160-bit digest from the security controller SHA engine 807 through 719b.
4. The Remote Interface Microcontroller 704 performs XORs at 820 each byte of the message received by 817 with a byte of the digest (the pad) received by 719b to obtain the encrypted message (output as 824).
5. The Remote Interface Microcontroller 704 concatenates the same random number of step 1 above through 809 and the encrypted message received at 824 and transmits the result packet at lines 712a and 712b through Message TX function 826. These output lines 712a and 712b may be proprietary protocol or standard protocol such as I2C or 1-Wire coupled to the transmitting media side data channel (such as fiber optical transceiver 710). The Remote Interface TX function 826 may also concatenates data from Message Builder function 816 directly through line 819. If output lines/bus 712 is not ready then message transmit buffer 827 may be used to temporarily store packets.

To prevent replay attacks (attacker recording legal packets and replay it later to fool the Secure KVM), Message Counter function 833 may be added to generate message sequential counter 814 added to the message. After the Secure KVM decrypts messages it is programmed to drop messages that are out of sequence. By adding counter values to each transmitted message, potential attackers must break the message encryption to generate a valid counter value before he/she can replay a recorded message out of sequence.

The SHA Engine 807 may also have an internal mechanism to perform secret rotation to further improve system security. The Remote Interface Microcontroller 704 may send a rotation message 719*c* to the SHA Engine 807 and ask that the message be hashed against the old secret to generate a new secret. The Remote Interface Microcontroller 704 does not need to know the old secret to generate the new secret, and the new secret is never revealed—never visible outside the security controller 407. In this manner, the system-wide secret can be easily changed (rotated). An attacker is required to have access to the original secret and the rotation message to reveal the new secret. This allows a system to rotate secrets from time to time to assure secret security. It should be noted that if this method of key rotation is implemented, the security controller 96 of the coupled Secure KVM 706 should also configured to support this feature.

FIG. 17 illustrates a block diagram of Secure KVM 706 data receiving, processing and decryption from Secure KVM Remote Controller-Indicator 702 of FIGS. 10 to 13 above. This figure shows both processes and physical blocks to better illustrate the internal data flows.

The Remote Interface Microcontroller 725 is coupled to the optional security controller 96 that assists the Remote Interface Microcontroller 725 in mathematical functions such as SHA 807.

Data received through communication media data side channel through lines 723*a* and 723*b* in proprietary protocol or standard protocol such as I²C or 1-Wire. The data is processed through the following steps:

1. Message RX function 830 receives the input data and restructures it in 512 bit packets. Incoming data may be stored in buffer 832 as needed to handle traffic. Output packets are passed through 836 to the XOR function 838 or directly to the Message Translator function 850 if not encrypted.
2. The part of the incoming packet that contains the random number is cut from packet and sent to the security controller 96 through 732*a*.
3. In the security controller 96 random number enters the SHA engine 807 where it is used together with the secret 805 to generate a SHA-1 digest output 732*b*.
4. Output digest 732*a* serves as a pad in XOR function 838 to XOR the incoming packet. The plain text output is passed through output 840 to the Message Translator function 850.
5. Message Translator function 850 cut the plain text message into various discrete signals and stream coupled to other Secure KVM 706 components.
6. In case that an error is detected in packet, information is passed from the Message Translator function 850 to the Errors and Logs function 846 where event is classified and logged for further analysis.
7. In case that an incoming packet is out of sequential order, or if it is suspected as a replayed packet, the Message Translator function 850 may discard the packet and report to the Errors and Logs function 846.

Outputs from the Message Translator function 850 may include:

Remote smart-card reader USB to smart-card selector switch 82 through USB lines 83, Smart-card selector switch 82 local/remote through output line 84, Messages to/from main controller function 960 through lines 60 (including channel selected, TAMPERED flag from remote side etc.), Keyboard and mouse traffic in proprietary unidirectional protocol to peripheral data-diode 625 through output line 61, Smart-card status and control messages coupled to smart-card pre-qualification microcontroller 952 through lines 944 (including port status, freeze and unfreeze messages), Remote display EDID information to EDID input switch 924 through lines 726, Audio output data stream coupled to audio CODEC 60 through AC-Link or PS lines 722.

Security controller 96 SHA Engine 807 may also support key rotation as shown in FIG. 16 above through line 732*c*.

Security related events resulted from Secure KVM Remote Controller-Indicator 702 may include the following:
1. Failed pairing—due to invalid key,
2. Failed pairing—due to key—Secure KVM 706 Remote Controller-Indicator 702 mismatch,
3. Failed pairing—due to key—Secure KVM 706 mismatch,
4. Successful pairing with paired Secure KVM Remote Controller-Indicator 702 serial number,
5. Secure KVM Remote Controller-Indicator 702 disconnected during operation,
6. Authentication failed (and number of attempts),
7. Communication failed,
8. Secure KVM Remote Controller-Indicator 702 tampered,
9. Secure KVM Remote Controller-Indicator 702 was disabled due to coupled Secure KVM 706 tampering event.
10. Secure KVM Remote Controller-Indicator 702 low battery,
11. Secure KVM Remote Controller-Indicator 702 Self Test Failed.

Although other (more complex) encryption methods may be used to build an embodiment of the current invention, in this simple implementation security is assured by the strength of the SHA-1 function. Because the SHA-1 hash function is not reversible, the secret cannot be derived from the message traffic. Without the secret, there is no way to decipher or falsify a message. The random seed value used with each message makes every message unique, and makes the deciphering messages extremely difficult.

FIG. 18*a* illustrates an example of the front panel of Secure KVM Remote Controller-Indicator 702 according to the present invention. In this figure graphic LCD 99 is preferably located in the center of the device facing the user. Rotary encoder 98 knob located to the right side of the LCD 99. Ambient light sensor 90 is located near LCD 99.

FIG. 18*b* illustrates an example of the back panel of Secure KVM Remote Controller-Indicator 702 according to the present invention. The back panel comprises of: Fiber optic transceiver 710, remote display output connector 621, remote keyboard jack 619, remote mouse jack 617, remote microphone jack 623*b*, remote headset jack 623*a*, remote smart-card reader jack 609 and DC input jack 730.

FIG. 19*a* illustrates an example of the front panel of Secure KVM 706 according to the present invention. The device front panel comprises of: local smart-card reader jack 11, smart-card freeze push-button 8, local smart-card reader jack port LED 180, local channel selection push-buttons 9*a* to 9*d*, channel selection indicator LEDs 23*a* to 23*d* and tampering evident label 49.

FIG. 19*b* illustrates an example of the back panel of Secure KVM 706 according to the present invention. The device back panel comprises of: local console keyboard jack 314*a*, local console mouse jack 314*b*, local console user display port 17, local console audio out jack 67*a*, local console microphone jack 67*b*, optical fiber transceiver 722, host 1 to host 4 peripheral USB jacks 915*a* to 915*d* respectively, host 1 to host 4 smart-card USB jacks 960*a* to 960*d* respectively, host 1 to host 4 audio input jacks 27*a* to 27*d* respectively, host 1 to host 4 audio output jacks 25*a* to 25*d* respectively and DC input jack 738.

FIG. 20 illustrates an example of possible implementation of Secure KVM Remote Controller-Indicator channel selection process and tampering indication.

In this figure rotary encoder with push action 98 is used for channel selection in conjunction with monochromatic graphical LCD 99. Channel names were previously entered into the Secure KVM Remote Controller-Indicator 702 by the user.

Figure 20A:
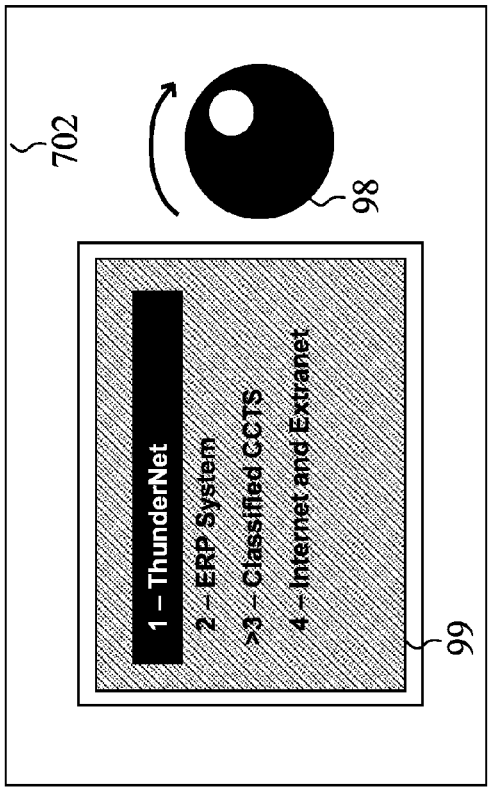

In FIG. 20*a* channel 1 (ThunderNet) was selected by the user as indicated by the reversed video line 750 (black colored). > cursor 751 is in first channel.

Figure 20C:
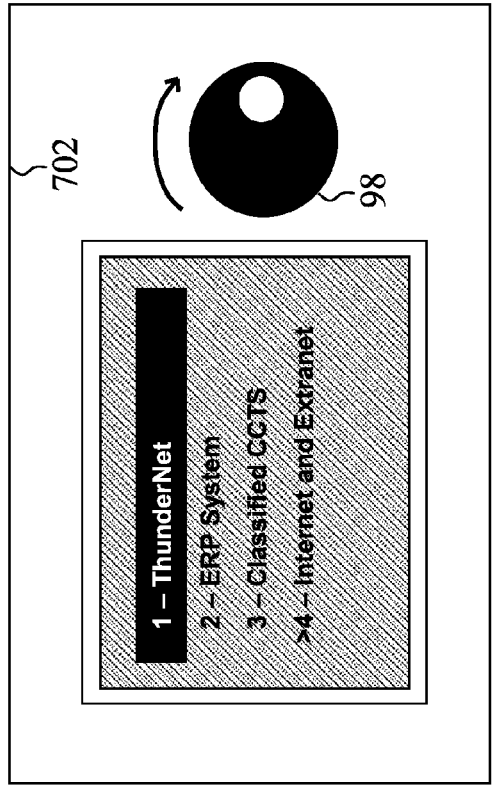
Figure 20B:
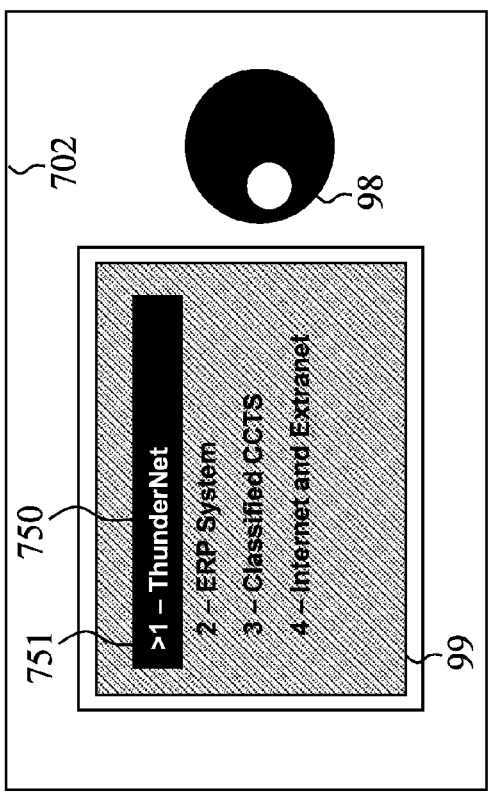

In FIG. 20*b* the user rotated the rotary encoder 98 knob to scroll down the cursor as indicated by the blinking > at the second channel (ERP System).

In FIG. 20*c* the user further rotates the rotary encoder 98 knob and the blinking cursor > is now in third channel (Classified CCTS).

Figure 20D:
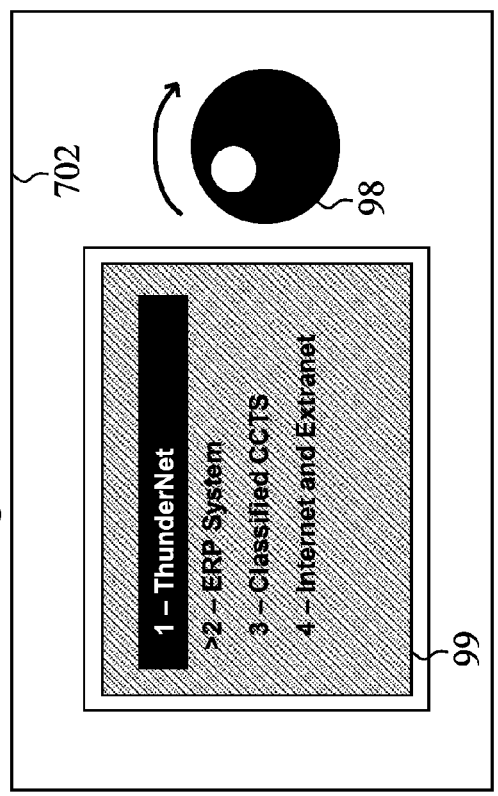

In FIG. 20*d* the user further rotates the rotary encoder 98 knob and the blinking cursor > is now in forth channel (Internet and Extranet). Still the channel selected is first channel.

Figure 20F:
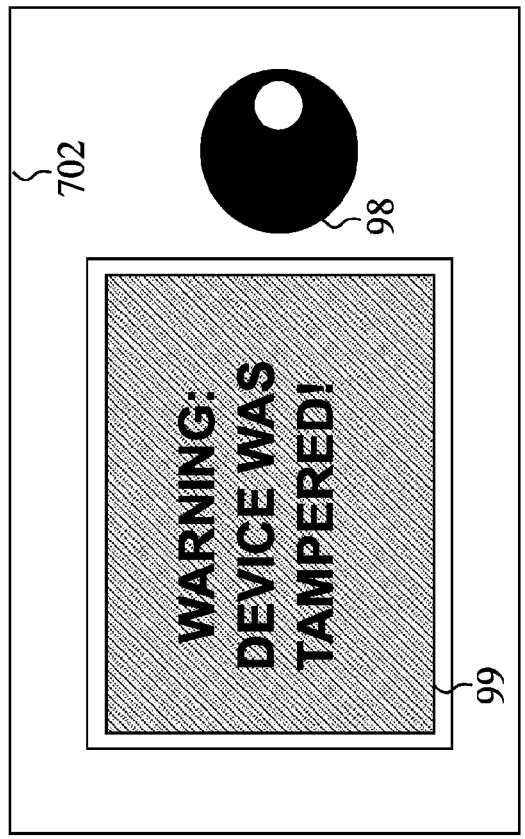
Figure 20E:
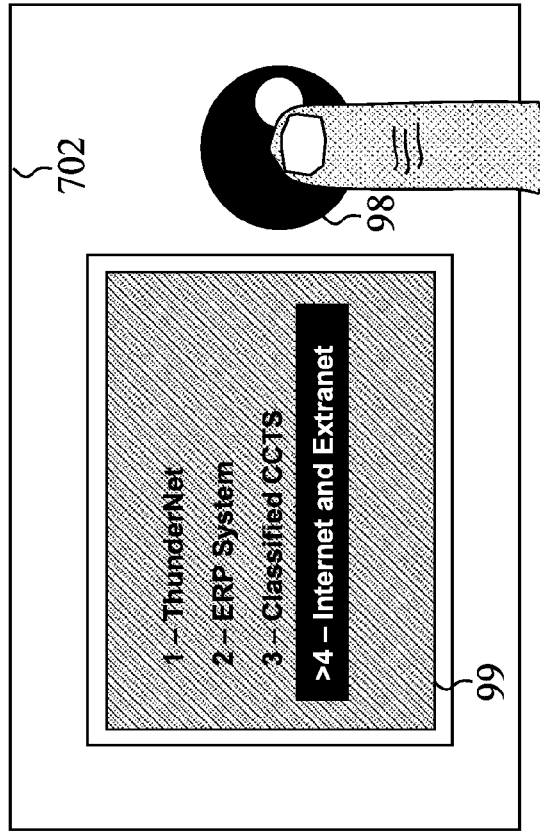

In FIG. 20*e* the user presses the rotary encoder 98 knob and the new channel selected is now the forth channel (Internet and Extranet) as indicated by the reverse video line. Cursor is not blinking and it is now in forth line.

Preferably, if the user does not press the rotary encoder 98 knob when the cursor > was moved (blinking) for 10 seconds then the cursor is automatically moved to the selected channel and stops blinking.

FIG. 20*f* illustrates the user indications after anti-tampering activation event. LCD 99 indicating a large blinking message: "WARNING: DEVICE WAS TAMPERED!" User channel selection or any other local or remote action is now disabled.

FIG. 21 illustrates a high-level block diagram of yet another example of multiple hosts and a Secure KVM system 740 of the present invention similar to system 700 of FIG. 10 above having dual remote displays.

In this FIG. 21 the remote keyboard 34, mouse 36, smart-card reader 42, headset 37 and its related circuitry were not shown to avoid clutter. These functions are similar to functions in FIG. 10 above.

In this embodiment of the present invention two optical fibers 720*a* and 720*b* are used to extend the video signal to remote displays 32*a* and 32*b* located at the remote user desktop 30. First set of optical Sub-Assemblies 722*a* (Transmit Optical Sub-Assembly or TOSA) and 710*a* (Receive Optical Sub-Assembly or ROSA) passes both video of first display 32*a* and data side-channel. Second set of optical Sub-Assemblies 722*b* (Transmit Optical Sub-Assembly or TOSA) and 710*b* (Receive Optical Sub-Assembly or ROSA) passes only video of the second display 32*b*. Additional Optical Sub-Assemblies may be added in a similar manner to support additional displays as needed.

Secure KVM 742 first display out video signal 729*a* is passed through optical Sub-Assemblies 722*a*, optical fiber 720*a* to the optical Sub-Assemblies 710*a* in Secure KVM Remote Controller-Indicator 744. In Secure KVM Remote Controller-Indicator 744 the video line 714*a* is passed through first video out port 621*a* to first (left) display 32*a*.

Similarly Secure KVM 742 second display out video signal 729*b* is passed through optical Sub-Assemblies 722*b*, optical fiber 720*b* to the optical Sub-Assemblies 710*b* in Secure KVM Remote Controller-Indicator 744. In Secure KVM Remote Controller-Indicator 744 the video line 714*b* is passed through second video out port 621*b* to second (right) display 32*b*. The two EDID lines 81*a* and 81*b* from display 32*a* and 32*b* respectively, are both coupled to the remote interface microcontroller 745 and passed through the data side-channel as in FIG. 10 above.

To enable independent remote user selection of host for each of the connected displays 32, additional rotary encoder installed in this Secure KVM Remote Controller-Indicator 744 of the present invention. Both encoders 98 are coupled to the remote interface microcontroller 745. Left and right rotary encoders 98*a* and 98*b* controls host channels for displays 32*a* and 32*b* respectively. Remote keyboard 34 and remote mouse 36 (*not shown here), may be connected to left display 32*a* assigned channel or right display 32*b* assigned channel based on user selection through pushing left rotary encoder 98*a* or right rotary encoder 98*b* respectively.

FIG. 22*a* illustrates an example of the front panel of a dual displays Secure KVM Remote Controller-Indicator 744 according to the present invention as shown in block diagram in FIG. 21 above. In this figure graphic LCD 99 is preferably located in the center of the device facing the user. Rotary encoder 98 knob located to the right side of the LCD 99. Ambient light sensor 90 is located near LCD 99.

LCD 99 is divided into left and right areas to enable independent channel selection of first display 32*a* and second display 32*b* respectively. Left display 32*a* channel selected indicated by left side reversed video line 750*a* and right display 32*b* channel selected indicated by right side reversed video line 750*b*.

Selection of keyboard and mouse assignment to left display selected channel or right display selected channel may be performed by user pushing rotary encoders 98*a* or 98*b* respectively. Left arrow 752 or right arrow (not shown) in LCD 99 indicates if console is coupled to left or right display respectively.

Additional switches or LEDs may be added in front panel to provide additional remote user controls and indications as necessary.

FIG. 22*b* illustrates an example of the back panel of a dual displays Secure KVM Remote Controller-Indicator 744 according to the present invention as shown in block diagram in FIG. 21 above. The back panel comprises of:

First fiber optic transceiver 710*a*,
Second fiber optic transceiver 710*b*,
First remote display output connector 621*a*
Second remote display output port 621*b*,
Remote keyboard jack 619,
Remote mouse jack 617,
Remote microphone jack 623*b*,
Remote headset jack 623*a*,
Remote smart-card reader jack 609, and
DC input jack 730.

FIG. 23 illustrates a high-level block diagram of yet another example of a Secure KVM system 1500 of the present invention in which the number of components in the remote controller 1502 was reduced.

In this exemplary embodiment of the present invention, a microcontroller 1504 of Secure KVM Remote Controller-Indicator 1502 integrates the functionality of: microcontroller 504; Anti-tampering controller 94; display microcontroller 120; and unidirectional data diodes 124 and 126.

Optionally, microcontroller 1504 is directly connected to touchscreen 99 instead of being connected via digital converter 92. This may be possible depending on the specific interface provided with touchscreen 99.

FIG. 24 illustrates a high-level block diagram of yet another example of a Secure KVM system 1600 of the present invention.

In this exemplary embodiment of the present invention, connection between KVM 1406 and remote controller 1047 is done using encrypted serial line 1074. Alternatively, connection between KVM 1406 and remote 1047 is done using encrypted Internet channel, for example VPN (Virtual Private Network). To facilitate this, KVM 1406 and remote controller 1047 are equipped with cryptographic unit 1096 and 1407 respectively. Optionally, cryptographic unit 1096 and/or 1407 may be integrated in microcontrollers 78 and/or 1504 respectively.

Optionally, microcontroller 1504 can be configured or re-configured via external connector 1222, for example a Micro USB connector 1222. To do so, an external programmer is connected to external connector 1222. Optionally, only administration mode is enabled via external connector 1222. Optionally, external programmer is authenticated before it can interact with remote controller 1047. Additionally, or alternatively, configured or re-configured by inserting a pre-loaded non-volatile memory 1266 into slot 1232. Memory into slot 1232 may optionally be a Micro-SD type slot. Optionally, non-volatile memory 1266 is authenticated before it can interact with remote controller 1047. Optionally, non-volatile memory 1266 may be reprogrammed only using a preprimary secure programming unit or after authentication.

Optionally, keypad 1098 is used as a user interface for remote controller 1047. Keypad 1098 may be used instead or in addition to rotary encoder. Keypad 1098 may be used instead or in addition to the touchscreen function of screen 99.

Optionally, in the embodiments of FIGS. 23 and 24, the remote controller cannot be reprogrammed using any of the user input devices and thus unidirectional data diode 124 and 126 may not be needed.

What is claimed is:

1. A secure peripheral switching system comprising:
   a secure peripheral switch, remotely coupled to a secure remote controller-indicator, wherein the said secure peripheral switch is configured to interface with at least two coupled host computers while ensuring data isolation among said at least two coupled host computers, said secure peripheral switch comprising a first interface circuitry to securely link the secure peripheral switch with said secure remote controller-indicator; and
   a secure remote controller-indicator comprising:
   a second interface circuitry to securely link said secure remote controller-indicator with said secure peripheral switch;
   a control function configured to enable a remote user control of said coupled secure peripheral switch;
   a remote controller-indicator for providing a remote user indications of said coupled secure peripheral switch; and
   an anti-tampering circuitry to detect a physical tampering event and report such event to said secure peripheral switch,
   wherein said remote controller-indicator comprises a field programmable visible display,
   wherein said field programmable visible display circuitry is logically isolated from said second interface circuitry to enhance system security, and
   wherein said anti-tampering circuitry is configured to permanently disable the functionality of said secure remote controller-indicator.

2. The system of claim 1, wherein each of said first interface circuitry and said second interface circuitry comprises an encryption/decryption function to secure the link between said secure peripheral switch and said secure remote controller-indicator.

3. The system of claim 1, wherein said field programmable visible display is isolated by at least one unidirectional data diode.

4. The system of claim 1, wherein said field programmable visible display circuitry enables field programming of said remote user-indicator of alphanumeric display and specific channel background color.

5. The system of claim 1, wherein said anti-tampering circuitry is configured to disable the secure remote controller-indicator functionality.

6. The system of claim 5, wherein said anti-tampering circuitry is configured to permanently disable said secure peripheral switch.

7. The system of claim 1, wherein said secure remote controller-indicator is configured to independently control user authentication channel selection.

8. The system of claim 1, wherein the interface link physical layer of the link coupling said secure remote controller-indicator with said secure peripheral switch is further used to power said secure remote controller-indicator remotely from the couple secure peripheral switch.

9. The system of claim 1, wherein said link coupling said secure peripheral switch with said secure peripheral switch physical layer uses at least one encrypted serial link.

10. The system of claim 1, wherein said secure remote controller-indicator further comprises a trusted platform module function to secure the secure remote controller-indicator and the interface link in front of the coupled secure peripheral switch and its at least two coupled host computers.

11. The system of claim 1, wherein each specific secure peripheral switch configured to interface only with a specific secure remote controller-indicator which was paired to it.

12. The system of claim 1, wherein said control function in said remote controller-indicator is user configurable only via authenticated external connector.

13. The system of claim 1, wherein said control function in said remote controller-indicator is user configurable by inserting a non-volatile memory into a memory slot in said remote controller-indicator.

14. A secure peripheral switching system comprising:
    a secure peripheral switch remotely coupled to a secure remote controller-indicator, wherein said secure peripheral switch is configured to interface with at least two coupled host computers while ensuring data isolation among said at least two coupled host computers, the secure peripheral switch comprising:
    a first interface circuitry configured to securely link the secure peripheral switch with said secure remote controller-indicator; and
    a secure remote controller-indicator comprising:
    a second interface circuitry to securely link said secure remote controller-indicator with said secure peripheral switch;
    a control function configured to enable a remote user control of said coupled secure peripheral switch; and
    an indicator configured to provide a remote user indications of a coupled secure peripheral switch; and
    anti-tampering circuitry configured to detect a physical tampering event, wherein said secure remote controller-indicator is configured to ensure data isolation among said at least two coupled host computers, and wherein the secure remote controller-indicator further comprises circuitry configured to enable remote connection to said secure peripheral switch of at least one user authentication device selected from the group consisting of a smart-card reader and security tokens, and wherein said anti-tampering circuitry is configured to permanently disable said secure remote controller-indicator.

15. The system of claim 14, wherein said anti-tampering circuitry is configured to permanently disable said secure peripheral switch functionality.

16. The system of claim 14, wherein each specific secure peripheral switch is configured to interface only with a specific secure remote controller-indicator which was paired to it.

* * * * *